US012057904B2

United States Patent
Jiang et al.

(10) Patent No.: US 12,057,904 B2
(45) Date of Patent: Aug. 6, 2024

(54) TRANSMIT CHANNEL INITIAL PHASE CORRECTION METHOD AND APPARATUS

(71) Applicant: Huawei Technologies Co., Ltd., Shenzhen (CN)

(72) Inventors: Xu Jiang, Shanghai (CN); Ye Yang, Shanghai (CN); Jiapeng Zhang, Shanghai (CN); Kai Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 22 days.

(21) Appl. No.: 18/154,997

(22) Filed: Jan. 16, 2023

(65) Prior Publication Data

US 2023/0208480 A1    Jun. 29, 2023

Related U.S. Application Data

(63) Continuation of application No. PCT/CN2021/106324, filed on Jul. 14, 2021.

(30) Foreign Application Priority Data

Jul. 17, 2020 (CN) .......................... 202010695907.X
Jul. 9, 2021 (CN) .......................... 202110781789.9

(51) Int. Cl.
*H04B 7/0456* (2017.01)
*H04B 7/06* (2006.01)

(52) U.S. Cl.
CPC ......... *H04B 7/0456* (2013.01); *H04B 7/0682* (2013.01)

(58) Field of Classification Search
CPC ............................. H04B 7/0456; H04B 7/0682
See application file for complete search history.

(56) References Cited

U.S. PATENT DOCUMENTS

| 11,323,162 | B2* | 5/2022 | Gudovskiy | ........... H04L 5/0048 |
| 2007/0183537 | A1* | 8/2007 | Matsumoto | ....... H04L 25/03038 375/340 |

(Continued)

FOREIGN PATENT DOCUMENTS

| CN | 103828270 A | 5/2014 |
| CN | 105656815 A | 6/2016 |

(Continued)

OTHER PUBLICATIONS

Jiang et al, "A Phase Calibration Method Based on L1-norm Minimization for Massive MIMO Systems," 2016 IEEE International Symposium on Personal, Indoor and Mobile Radio Communications—(PIMRC): Fundamentals and PHY, Dec. 22, 2016, 6 pages.

*Primary Examiner* — Janice N Tieu
(74) *Attorney, Agent, or Firm* — Slater Matsil, LLP

(57) ABSTRACT

An apparatus: obtains K downlink channel weight matrices based on K pieces of downlink channel information sent by K UEs, where the downlink channel information is fed back by the UE in response to a preset reference signal sent by the base station, the downlink channel weight matrix is an $N_T$×rank-dimensional matrix, and rank is a quantity of signal streams received by the UE; obtains K×rank first initial phase difference matrices and K×rank second initial phase difference matrices based on the K downlink channel weight matrices and a first polarization direction and a second polarization direction of transmit channels of the base station; obtains a cell initial phase difference matrix based on the K×rank first initial phase difference matrices and the K×rank second initial phase difference matrices; and implements initial phase correction of the transmit channels based on the cell initial phase difference matrix.

20 Claims, 7 Drawing Sheets

(56) References Cited

U.S. PATENT DOCUMENTS

| | | | |
|---|---|---|---|
| 2012/0062421 A1* | 3/2012 | Su | H04B 7/0417 |
| | | | 342/373 |
| 2015/0104189 A1 | 4/2015 | Fan et al. | |
| 2016/0197745 A1 | 7/2016 | Yi et al. | |
| 2017/0288307 A1 | 10/2017 | Hu et al. | |
| 2019/0229786 A1 | 7/2019 | Huang et al. | |
| 2019/0288780 A1 | 9/2019 | Rodriguez-Herrera et al. | |

FOREIGN PATENT DOCUMENTS

| | | |
|---|---|---|
| CN | 106411378 A | 2/2017 |
| CN | 109391305 A | 2/2019 |
| CN | 111385008 A | 7/2020 |
| EP | 3029900 A1 | 6/2016 |
| WO | 2018094709 A1 | 5/2018 |
| WO | 2020088168 A1 | 5/2020 |

\* cited by examiner

Schematic diagram of an arrangement
of transmit channels of a 4T base
station when M = 1 and N = 2

1   3   2   4

Schematic diagram of an arrangement
of transmit channels of a 4T base
station when M = 2 and N = 1

2   4

1   3

Schematic diagram of an arrangement of
transmit channels of an 8T base station
when M = 1 and N = 4

1   5   2   6   3   7   4   8

Schematic diagram of an arrangement
of transmit channels of an 8T base
station when M = 4 and N = 1

Schematic diagram of an arrangement
of transmit channels of an 8T base
station when M = 2 and N = 2

TRANSMIT CHANNEL INITIAL PHASE CORRECTION METHOD AND APPARATUS

CROSS-REFERENCE TO RELATED APPLICATIONS

This application is a continuation of International Application No. PCT/CN2021/106324, filed on Jul. 14, 2021, which claims priority to Chinese Patent Application No. 202010695907.X, filed on Jul. 17, 2020 and Chinese Patent Application No. 202110781789.9, filed on Jul. 9, 2021. All of the aforementioned patent applications are hereby incorporated by reference in their entireties.

TECHNICAL FIELD

This application relates to the field of communications technologies, and in particular, to a transmit channel initial phase correction method and an apparatus.

BACKGROUND

In an existing communication system, a base station includes a baseband processing unit (BBU), a remote radio unit (RRU), and an antenna unit. The BBU is connected to the RRU by using an optical fiber, and the RRU is connected to the antenna unit by using a coupling unit, a feeder (for example, a coaxial cable), and the like. For details, refer to a base station 10 shown in FIG. 1A. In a multiple-input multiple-output (MIMO) system, to form a valid beam and ensure performance and a capacity of the MIMO system, channel responses of all transmit and receive channels from the BBU to the antenna unit need to be consistent. Therefore, inconsistency between amplitudes, initial phases, and delays of the transmit channels from the BBU to the antenna unit needs to be corrected.

Currently, the base station corrects an amplitude, an initial phase, and a delay of a transmit channel by using a customized correction sequence at a coupling unit. However, the coupling unit is usually packaged with the RRU, and the feeder between the coupling unit and the antenna unit still affects corrected related parameters of the transmit channel. The feeder has little impact on the amplitude, and the delay may be measured in advance for compensation. However, a change of the initial phase is greatly affected by the feeder. Consequently, an initial phase error obtained through correction is still large. In order to further correct the initial phase to avoid impact of the feeder, the coupling unit usually needs to be disposed at the antenna unit. Consequently, a structure of an existing base station needs to be changed, causing additional hardware costs. Therefore, how to further correct the initial phase without changing the structure of the base station is a problem being studied by a person skilled in the art.

SUMMARY

Embodiments of this application provides a transmit channel initial phase correction method and an apparatus, to further correct initial phases of transmit channels without changing a structure of a base station, and avoid additional hardware costs.

According to a first aspect, an embodiment of this application provides a transmit channel initial phase correction method. The method includes: Abase station obtains K downlink channel weight matrices based on K pieces of downlink channel information sent by K UEs, where K is a positive integer, the downlink channel information is fed back by the UE in response to a preset reference signal sent by the base station, the downlink channel weight matrix is an $N_T \times rank$-dimensional matrix, $N_T$ is a quantity of transmit channels of the base station, and rank is a quantity of signal streams received by the UE; obtains K×rank first initial phase difference matrices based on the K downlink channel weight matrices and a first polarization direction of the transmit channels of the base station, and obtains K×rank second initial phase difference matrices based on the K downlink channel weight matrices and a second polarization direction of the transmit channels of the base station, where the first polarization direction and the second polarization direction are different, the first initial phase difference matrices and the second initial phase difference matrices are all M×N-dimensional matrices, $N_T = 2 \times M \times N$, and both M and N are positive integers; obtains a cell initial phase difference matrix based on the K×rank first initial phase difference matrices and the K×rank second initial phase difference matrices; and implements initial phase correction of the transmit channels of the base station based on the cell initial phase difference matrix.

Optionally, the preset reference signal is a channel state information reference signal CSI-RS.

In this embodiment of this application, the preset reference signal is sent by the base station to the UE, and passes through a coupling unit and an antenna unit of the base station and a feeder between the coupling unit and the antenna unit inside the base station. The K pieces of downlink channel information are fed back by the UE in response to the preset reference signal. In addition, the cell initial phase difference matrix is obtained based on the K pieces of downlink channel information. Therefore, initial phase correction of the transmit channels of the base station is implemented by using the cell initial phase difference matrix, and impact of the feeder between the coupling unit and the antenna unit on initial phases of the transmit channels is fully considered. In this way, the initial phases of the transmit channels can be further corrected without changing a hardware structure of the base station, to reduce an initial phase correction error while avoiding additional hardware costs.

In a possible implementation, the downlink channel information includes at least one precoding matrix indicator PMI fed back by the UE and/or a sounding reference signal SRS fed back by the UE.

In this embodiment of this application, the downlink channel information sent by the UE may be in a plurality of forms. Therefore, the downlink channel weight matrix may also be obtained in a plurality of forms based on the downlink channel information. There are various processing methods, which can meet requirements that downlink channel information fed back by different UEs in different scenarios may be different, and meet different processing requirements of the base station in different scenarios. Application scenarios are also wider.

In a possible implementation, the downlink channel information is the SRS fed back by the UE; and that the base station obtains K downlink channel weight matrices based on K pieces of downlink channel information sent by K UEs includes: obtaining K downlink channel matrices based on the K pieces of downlink channel information, where the downlink channel matrices are $N_R \times N_T$-dimensional matrices, and $N_R$ is a quantity of receive channels of the UE; and performing singular value decomposition on the K downlink channel matrices to obtain K×rank right singular vectors, where one downlink channel weight matrix includes rank right singular vectors, and one right singular vector includes $N_T$ elements.

In a possible implementation, the obtaining K×rank first initial phase difference matrices based on the K downlink channel weight matrices and a first polarization direction of the transmit channels of the base station, and obtaining K×rank second initial phase difference matrices based on the K downlink channel weight matrices and a second polarization direction of the transmit channels of the base station includes: obtaining K×rank first phase matrices based on the K downlink channel weight matrices and the first polarization direction, and obtaining K×rank second phase matrices based on the K downlink channel weight matrices and the second polarization direction, where the first phase matrices and the second phase matrices are all M×N-dimensional matrices; and obtaining K×rank first initial phase difference matrices based on the K×rank first phase matrices, and obtaining K×rank second initial phase difference matrices based on the K×rank second phase matrices.

In this embodiment of this application, coherence between transmit channels with a same polarization direction is strong, and coherence between transmit channels with different polarization directions is weak. The base station separately obtains, based on different polarization directions, the first phase matrices corresponding to transmit channels whose polarization directions are the first polarization direction and the second phase matrices corresponding to transmit channels whose polarization directions are the second polarization direction. Then, the base station separately obtains, based on the first phase and the second phase matrices, the first initial phase difference matrices corresponding to the transmit channels whose polarization directions are the first polarization direction and the second initial phase difference matrices corresponding to the transmit channels whose polarization directions are the second polarization direction. Different processing situations of transmit channels with different polarization directions are fully considered, and a cell initial phase difference obtained based on the first initial phase difference matrices and the second initial phase difference matrices is more consistent with an actual situation. Therefore, the initial phase correction of the transmit channel of the base station is implemented by using the cell initial phase difference matrix, so that an initial phase correction error can be further reduced.

In a possible implementation, the transmit channels of the base station include transmit channels of M rows and N columns whose polarization directions are the first polarization direction, and transmit channels of M rows and N columns whose polarization directions are the second polarization direction; any element in the first phase matrix is a phase of a corresponding transmit channel whose polarization direction is the first polarization direction, and any element in the second phase matrix is a phase of a corresponding transmit channel whose polarization direction is the second polarization direction; any element in the first initial phase difference matrix is a phase compensation value of a corresponding transmit channel whose polarization direction is the first polarization direction, and any element in the second initial phase difference matrix is a phase compensation value of a corresponding transmit channel whose polarization direction is the second polarization direction.

In a possible implementation, the first phase matrix $\varphi^+$ and the second phase matrix $\varphi^-$ are specifically as follows:

$$\varphi^+ = \begin{bmatrix} \varphi_{M,1} & \varphi_{M,2} & \cdots & \cdots & \cdots & \varphi_{M,N} \\ \vdots & \vdots & \ddots & \vdots & \ddots & \vdots \\ \varphi_{m,1} & \varphi_{m,2} & \cdots & \varphi_{m,n} & \cdots & \varphi_{m,N} \\ \vdots & \vdots & \ddots & \vdots & \ddots & \vdots \\ \varphi_{1,1} & \varphi_{1,2} & \cdots & \cdots & \cdots & \varphi_{1,N} \end{bmatrix}; \text{ and}$$

$$\varphi^- = \begin{bmatrix} \varphi'_{M,1} & \varphi'_{M,2} & \cdots & \cdots & \cdots & \varphi'_{M,N} \\ \vdots & \vdots & \ddots & \vdots & \ddots & \vdots \\ \varphi'_{m,1} & \varphi'_{m,2} & \cdots & \varphi'_{m,n} & \cdots & \varphi'_{m,N} \\ \vdots & \vdots & \ddots & \vdots & \ddots & \vdots \\ \varphi'_{1,1} & \varphi'_{1,2} & \cdots & \cdots & \cdots & \varphi'_{1,N} \end{bmatrix}.$$

A value range of m is [1, M], a value range of n is [1, N], and both m and n are positive integers; and $\varphi_{m,n}$ is a phase of a transmit channel in an $m^{th}$ row and an $n^{th}$ column in transmit channels of M rows and N columns whose polarization directions are the first polarization direction, and $\varphi_{m,n}'$ is a phase of a transmit channel in an $m^{th}$ row and an $n^{th}$ column in transmit channels of M rows and N columns whose polarization directions are the second polarization direction.

The first initial phase difference matrix $\theta^+$ and the second initial phase difference matrix $\theta^-$ are specifically as follows:

$$\theta^+ = (-1) \times \begin{bmatrix} \theta_{M,1} & \theta_{M,2} & \cdots & \cdots & \cdots & \theta_{M,N} \\ \vdots & \vdots & \ddots & \vdots & \ddots & \vdots \\ \theta_{m,1} & \theta_{m,2} & \cdots & \theta_{m,n} & \cdots & \theta_{m,N} \\ \vdots & \vdots & \ddots & \vdots & \ddots & \vdots \\ \theta_{1,1} & \theta_{1,2} & \cdots & \cdots & \cdots & \theta_{1,N} \end{bmatrix}; \text{ and}$$

$$\theta^- = (-1) \times \begin{bmatrix} \theta'_{M,1} & \theta'_{M,2} & \cdots & \cdots & \cdots & \theta'_{M,N} \\ \vdots & \vdots & \ddots & \vdots & \ddots & \vdots \\ \theta'_{m,1} & \theta'_{m,2} & \cdots & \theta'_{m,n} & \cdots & \theta'_{m,N} \\ \vdots & \vdots & \ddots & \vdots & \ddots & \vdots \\ \theta'_{1,1} & \theta'_{1,2} & \cdots & \cdots & \cdots & \theta'_{1,N} \end{bmatrix}.$$

$\theta_{m,n}$ is a first phase compensation value of the transmit channel in the $m^{th}$ row and the $n^{th}$ column of the transmit channels of M rows and N columns whose polarization directions are the first polarization direction, and $\theta_{m,n}=(n-1)\times\Delta_H+(m-1)\times\Delta_V+\varphi_{1,1}-\varphi_{m,n}$; $\theta_{m,n}'$ is a second phase compensation value of the transmit channel in the $m^{th}$ row and the $n^{th}$ column of the transmit channels of M rows and N columns whose polarization directions are the second polarization direction, and $\theta_{m,n}'=(n-1)\times\Delta_H+(m-1)\times\Delta_V+\varphi_{1,1}'-\varphi_{m,n}'$; and $\Delta_H=\varphi_{1,2}-\varphi_{1,1}$, and $\Delta_V=\varphi_{2,1}-\varphi_{1,1}$.

In a possible implementation, the cell initial phase difference matrix includes $N_T$ elements; an element that is in the cell initial phase difference matrix and that corresponds to the transmit channel in the $m^{th}$ row and the $n^{th}$ column in the transmit channels of M rows and N columns whose polarization directions are the first polarization direction is obtained by the base station by performing filtering on the first phase compensation value $\theta_{m,n}$ in the K×rank first initial phase difference matrices for first preset duration; and an element that is in the cell initial phase difference matrix and that corresponds to the transmit channel in the $m^{th}$ row and the $n^{th}$ column in the transmit channels of M rows and N columns whose polarization directions are the second polarization direction is obtained by the base station by performing filtering on the second phase compensation value $\theta_{m,n}'$ in the K×rank second initial phase difference matrices for second preset duration, where a filtering method is a direct average filtering method or an alpha mean filtering method.

Specifically, the first preset duration and the second preset duration may be equal or not equal.

In this embodiment of this application, coherence between transmit channels with a same polarization direction is strong, and coherence between transmit channels with different polarization directions is weak. The base station not only separately obtains the first initial phase difference matrices and the second initial phase difference matrices based on the different polarization directions, but also separately calculates elements in the cell initial phase difference matrix based on the different polarization directions. Different processing situations of transmit channels with different polarization directions are fully considered, and the cell initial phase difference matrix obtained through calculation is more consistent with an actual situation. Therefore, the initial phase correction of the transmit channel of the base station is implemented by using the cell initial phase difference matrix, so that an initial phase correction error can be further reduced.

In a possible implementation, the cell initial phase difference matrix includes $N_T$ elements, and any element in the cell initial phase difference matrix corresponds to one transmit channel in the transmit channels of the base station and is for initial phase correction of the transmit channel.

According to a second aspect, an embodiment of this application provides a base station, including: a first processing unit, configured to obtain K downlink channel weight matrices based on K pieces of downlink channel information sent by K UEs, where K is a positive integer, the downlink channel information is fed back by the UE in response to a preset reference signal sent by the base station, the downlink channel weight matrix is an $N_T \times \text{rank}$-dimensional matrix, $N_T$ is a quantity of transmit channels of the base station, and rank is a quantity of signal streams received by the UE; a second processing unit, configured to: obtain K×rank first initial phase difference matrices based on the K downlink channel weight matrices and a first polarization direction of the transmit channels of the base station, and obtain K×rank second initial phase difference matrices based on the K downlink channel weight matrices and a second polarization direction of the transmit channels of the base station, where the first polarization direction and the second polarization direction are different, the first initial phase difference matrices and the second initial phase difference matrices are all M×N-dimensional matrices, $N_T=2\times M\times N$, and both M and N are positive integers; a third processing unit, configured to obtain a cell initial phase difference matrix based on the K×rank first initial phase difference matrices and the K×rank second initial phase difference matrices; and a correction unit, configured to implement initial phase correction of the transmit channels of the base station based on the cell initial phase difference matrix.

In this embodiment of this application, the preset reference signal is sent by the base station to the UE, and passes through a coupling unit and an antenna unit of the base station and a feeder between the coupling unit and the antenna unit inside the base station. The K pieces of downlink channel information are fed back by the UE in response to the preset reference signal. In addition, the cell initial phase difference matrix is obtained based on the K pieces of downlink channel information. Therefore, initial phase correction of the transmit channels of the base station is implemented by using the cell initial phase difference matrix, and impact of the feeder between the coupling unit and the antenna unit on initial phases of the transmit channels is fully considered. In this way, the initial phases of the transmit channels can be further corrected without changing a hardware structure of the base station, to reduce an initial phase correction error while avoiding additional hardware costs.

In a possible implementation, the downlink channel information includes at least one PMI fed back by the UE and/or an SRS fed back by the UE.

In this embodiment of this application, the downlink channel information sent by the UE may be in a plurality of forms. Therefore, the downlink channel weight matrix may also be obtained in a plurality of forms based on the downlink channel information. There are various processing methods, which can meet different requirements of different UE for feeding back the downlink channel information in different scenarios, and meet different processing requirements of the base station in different scenarios. Application scenarios are also wider.

In a possible implementation, the downlink channel information is the SRS fed back by the UE; and the first processing unit includes: a fourth processing unit, configured to obtain K downlink channel matrices based on the K pieces of downlink channel information, where the downlink channel matrices are $N_R \times N_T$-dimensional matrices, and $N_R$ is a quantity of receive channels of the UE; and a fifth processing unit, configured to perform singular value decomposition on the K downlink channel matrices to obtain K×rank right singular vectors, where one downlink channel weight matrix includes rank right singular vectors, and one right singular vector includes $N_T$ elements.

In a possible implementation, the second processing unit includes: a sixth processing unit, configured to: obtain K×rank first phase matrices based on the K downlink channel weight matrices and the first polarization direction, and obtain K×rank second phase matrices based on the K downlink channel weight matrices and the second polarization direction, where the first phase matrices and the second phase matrices are all M×N-dimensional matrices; and a seventh processing unit, configured to: obtain K×rank first initial phase difference matrices based on the K×rank first phase matrices, and obtain K×rank second initial phase difference matrices based on the K×rank second phase matrices.

In this embodiment of this application, coherence between transmit channels with a same polarization direction is strong, and coherence between transmit channels with different polarization directions is weak. The base station separately obtains, based on different polarization directions, the first phase matrices corresponding to transmit channels whose polarization directions are the first polarization direction and the second phase matrices corresponding to transmit channels whose polarization directions are the second polarization direction. Then, the base station separately obtains, based on the first phase and the second phase matrices, the first initial phase difference matrices corresponding to the transmit channels whose polarization directions are the first polarization direction and the second initial phase difference matrices corresponding to the transmit channels whose polarization directions are the second polarization direction. Different processing situations of transmit channels with different polarization directions are fully considered, and a cell initial phase difference obtained based on the first initial phase difference matrices and the second initial phase difference matrices is more consistent with an actual situation. Therefore, the initial phase correction of the transmit channel of the base station is implemented by using the cell initial phase difference matrix, so that an initial phase correction error can be further reduced.

In a possible implementation, the transmit channels of the base station include transmit channels of M rows and N columns whose polarization directions are the first polarization direction, and transmit channels of M rows and N columns whose polarization directions are the second polarization direction; any element in the first phase matrix is a phase of a corresponding transmit channel whose polarization direction is the first polarization direction, and any element in the second phase matrix is a phase of a corresponding transmit channel whose polarization direction is the second polarization direction; any element in the first initial phase difference matrix is a phase compensation value of a corresponding transmit channel whose polarization direction is the first polarization direction, and any element in the second initial phase difference matrix is a phase compensation value of a corresponding transmit channel whose polarization direction is the second polarization direction.

In a possible implementation, the first phase matrix $\varphi^+$ and the second phase matrix $\varphi^-$ are specifically as follows:

$$\varphi^+ = \begin{bmatrix} \varphi_{M,1} & \varphi_{M,2} & \cdots & \cdots & \cdots & \varphi_{M,N} \\ \vdots & \vdots & \ddots & \vdots & \ddots & \vdots \\ \varphi_{m,1} & \varphi_{m,2} & \cdots & \varphi_{m,n} & \cdots & \varphi_{m,N} \\ \vdots & \vdots & \ddots & \vdots & \ddots & \vdots \\ \varphi_{1,1} & \varphi_{1,2} & \cdots & \cdots & \cdots & \varphi_{1,N} \end{bmatrix}; \text{ and}$$

$$\varphi^- = \begin{bmatrix} \varphi'_{M,1} & \varphi'_{M,2} & \cdots & \cdots & \cdots & \varphi'_{M,N} \\ \vdots & \vdots & \ddots & \vdots & \ddots & \vdots \\ \varphi'_{m,1} & \varphi'_{m,2} & \cdots & \varphi'_{m,n} & \cdots & \varphi'_{m,N} \\ \vdots & \vdots & \ddots & \vdots & \ddots & \vdots \\ \varphi'_{1,1} & \varphi'_{1,2} & \cdots & \cdots & \cdots & \varphi'_{1,N} \end{bmatrix}.$$

A value range of m is [1, M], a value range of n is [1, N], and both m and n are positive integers; and $\varphi_{m,n}$ is a phase of a transmit channel in an $m^{th}$ row and an $n^{th}$ column in transmit channels of M rows and N columns whose polarization directions are the first polarization direction, and $\varphi_{m,n}'$ is a phase of a transmit channel in an $m^{th}$ row and an $n^{th}$ column in transmit channels of M rows and N columns whose polarization directions are the second polarization direction.

The first initial phase difference matrix $\theta^+$ and the second initial phase difference matrix $\theta^-$ are specifically as follows:

$$\theta^+ = (-1) \times \begin{bmatrix} \theta_{M,1} & \theta_{M,2} & \cdots & \cdots & \cdots & \theta_{M,N} \\ \vdots & \vdots & \ddots & \vdots & \ddots & \vdots \\ \theta_{m,1} & \theta_{m,2} & \cdots & \theta_{m,n} & \cdots & \theta_{m,N} \\ \vdots & \vdots & \ddots & \vdots & \ddots & \vdots \\ \theta_{1,1} & \theta_{1,2} & \cdots & \cdots & \cdots & \theta_{1,N} \end{bmatrix}; \text{ and}$$

$$\theta^- = (-1) \times \begin{bmatrix} \theta'_{M,1} & \theta'_{M,2} & \cdots & \cdots & \cdots & \theta'_{M,N} \\ \vdots & \vdots & \ddots & \vdots & \ddots & \vdots \\ \theta'_{m,1} & \theta'_{m,2} & \cdots & \theta'_{m,n} & \cdots & \theta'_{m,N} \\ \vdots & \vdots & \ddots & \vdots & \ddots & \vdots \\ \theta'_{1,1} & \theta'_{1,2} & \cdots & \cdots & \cdots & \theta'_{1,N} \end{bmatrix}.$$

$\theta_{m,n}$ is a first phase compensation value of the transmit channel in the $m^{th}$ row and the $n^{th}$ column of the transmit channels of M rows and N columns whose polarization directions are the first polarization direction, and $\theta_{m,n}=(n-1)\times\Delta_H+(m-1)\times\Delta_V+\varphi_{1,1}-\varphi_{m,n}$; $\theta_{m,n}'$ is a second phase compensation value of the transmit channel in the $m^{th}$ row and the $n^{th}$ column of the transmit channels of M rows and N columns whose polarization directions are the second polarization direction, and $\theta_{m,n}'=(n-1)\times\Delta_H+(m-1)\times\Delta_V+\varphi_{1,1}'-\varphi_{m,n}'$; and $\Delta_H=\varphi_{1,2}-\varphi_{1,1}$, and $\Delta_V=\varphi_{2,1}-\varphi_{1,1}$.

In a possible implementation, the cell initial phase difference matrix includes $N_T$ elements; an element that is in the cell initial phase difference matrix and that corresponds to the transmit channel in the $m^{th}$ row and the $n^{th}$ column in the transmit channels of M rows and N columns whose polarization directions are the first polarization direction is obtained by the base station by performing filtering on the first phase compensation value $\theta_{m,n}$ in the K×rank first initial phase difference matrices for first preset duration; and an element that is in the cell initial phase difference matrix and that corresponds to the transmit channel in the $m^{th}$ row and the $n^{th}$ column in the transmit channels of M rows and N columns whose polarization directions are the second polarization direction is obtained by the base station by performing filtering on the second phase compensation value $\theta_{m,n}'$ in the K×rank second initial phase difference matrices for second preset duration, where a filtering method is a direct average filtering method or an alpha mean filtering method.

Specifically, the first preset duration and the second preset duration may be equal or not equal.

In this embodiment of this application, coherence between transmit channels with a same polarization direction is strong, and coherence between transmit channels with different polarization directions is weak. The base station not only separately obtains the first initial phase difference matrices and the second initial phase difference matrices based on the different polarization directions, but also separately calculates elements in the cell initial phase difference matrix based on the different polarization directions. Different processing situations of transmit channels with different polarization directions are fully considered, and the cell initial phase difference matrix obtained through calculation is more consistent with an actual situation. Therefore, the initial phase correction of the transmit channel of the base station is implemented by using the cell initial phase difference matrix, so that an initial phase correction error can be further reduced.

In a possible implementation, the cell initial phase difference matrix includes $N_T$ elements, and any element in the cell initial phase difference matrix corresponds to one transmit channel in the transmit channels of the base station and is for initial phase correction of the transmit channel.

According to a third aspect, an embodiment of this application provides a base station, including a transceiver, a processor, and a memory. The memory is configured to store computer program code, the computer program code includes computer instructions, and the processor invokes the computer instructions to enable the base station to perform the transmit channel initial phase correction method according to any one of the first aspect or the implementations of the first aspect in embodiments of this application.

According to a fourth aspect, an embodiment of this application provides a computer storage medium. The computer storage medium stores a computer program. The computer program includes program instructions. When executed by a processor, the program instructions are configured to perform the transmit channel initial phase correction method according to any one of the first aspect or the implementations of the first aspect in embodiments of this application.

According to a fifth aspect, an embodiment of this application provides a computer program product. When the computer program product runs on a base station, the base station is enabled to perform the transmit channel initial phase correction method according to any one of the first aspect or the implementations of the first aspect in embodiments of this application.

According to a sixth aspect, an embodiment of this application provides a chip. The chip includes at least one processor and an interface circuit. Optionally, the chip further includes a memory. The memory, the interface circuit, and the at least one processor are interconnected through a line. The at least one memory stores a computer program. When the computer program is executed by the processor, the transmit channel initial phase correction method according to any one of the first aspect or the implementations of the first aspect in embodiments of this application is implemented.

It may be understood that the base station provided in the third aspect, the computer storage medium provided in the fourth aspect, the computer program product provided in the fifth aspect, and the chip provided in the sixth aspect are all for performing the transmit channel initial phase correction method for a provided in the first aspect. Therefore, for beneficial effects that can be achieved, refer to beneficial effects in the transmit channel initial phase correction method provided in the first aspect. Details are not described herein again.

BRIEF DESCRIPTION OF DRAWINGS

The following describes the accompanying drawings used in embodiments of this application.

DESCRIPTION OF EMBODIMENTS

The following describes embodiments of this application with reference to the accompanying drawings in embodiments of this application.

Figure 1A:
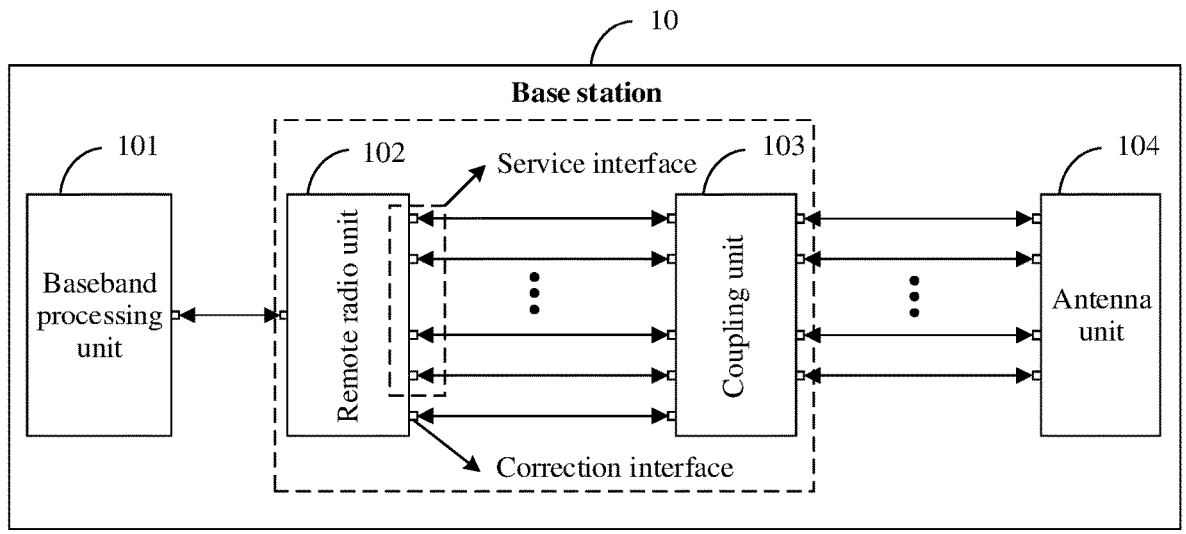
FIG. 1A is a schematic diagram of a structure of a base station.

FIG. 1A is a schematic diagram of a structure of a base station. The base station 10 includes a baseband processing unit (BBU) 101, a remote radio unit (RRU) 102, a coupling unit 103, and an antenna unit 104. The BBU 101 is connected to the RRU 102 by using an optical fiber, the coupling unit 103 and the RRU 102 are encapsulated together, and the RRU 102 is connected to the antenna unit 104 by using the coupling unit 103, a feeder (for example, a coaxial cable), and the like. One base station 10 may include one BBU 101 and a plurality of RRUs 102. One base station 10 may include at least one transmit channel and one receive channel, and each transmit channel corresponds to one receive channel.

As shown in FIG. 1A, the coupling unit 103 and the RRU 102 are encapsulated together by using at least one service interface and one correction interface. The service interface is configured to transmit service data, and the correction interface is configured to transmit a correction signal. The RRU 102 and the coupling unit 103 may alternatively be connected by using a feeder, for example, a feeder corresponding to the at least one service interface and a feeder corresponding to the correction interface. Because impact of the feeder on the transmit channel may be obtained through measurement by the coupling unit 103, impact of the feeder is not considered in this embodiment of this application.

The coupling unit 103 may be connected to the antenna unit 104 by using a feeder. There may be a plurality of feeders, and the feeder may be in a one-to-one correspondence with the at least one service interface. Optionally, a quantity of the feeders may be equal to a quantity of the at least one service interface, and may be equal to a quantity of transmit channels of the base station 10.

It should be noted that the quantity of transmit channels of the base station 10 is less than or equal to a quantity of transmit antennas of the base station 10. One transmit channel may drive at least one transmit antenna.

It may be understood that although FIG. 1A shows only one correction interface, during specific implementation, there may be a plurality of correction interfaces. This is not limited in this embodiment of this application.

It may be understood that although FIG. 1A shows only one BBU 101 and one RRU 102, during specific implementation, one BBU 101 may be connected to a plurality of RRUs 102, and one RRU 102 may also be connected to BBUs 101 of different base stations. In addition, a plurality of RRUs 102 connected to one BBU 101 may correspond to different cells of the base station 10. This is not limited in this embodiment of this application.

Figure 1B:
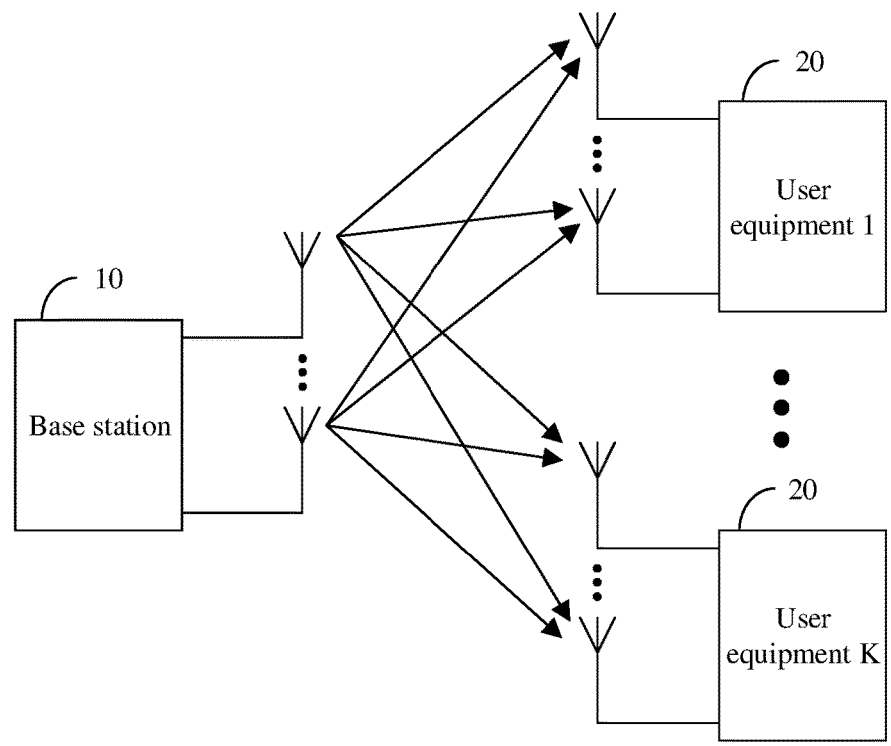
FIG. 1B is a schematic diagram of a structure of a transmit channel initial phase correction system according to an embodiment of this application.

FIG. 1B shows a transmit channel initial phase correction system according to an embodiment of this application. The system includes a base station 10 and K user equipments (UEs) 20, where K is greater than or equal to 1. For a structure of the base station 10, refer to FIG. 1A. The base station 10 may communicate with any one of the K UEs through an air interface.

It may be understood that although FIG. 1B shows only K UEs, during specific implementation, there may be another UE. The base station 10 may also communicate with the another UE through an air interface. This is not limited in this embodiment of this application.

As shown in FIG. 1A and FIG. 1B, a service interface of the RRU 102 is configured to transmit service data. In an uplink direction, the UE 20 may send service data to the base station 10 through a transmit channel of the UE 20, and the base station 10 may receive the service data through a receive channel of the base station 10. Inside the base station 10, the service data passes through the antenna unit 104, the coupling unit 103, and the RRU 102 (for example, a service interface of the RRU 102), and is finally transmitted to the BBU 101. In a downlink direction, service data sent by the base station 10 to the UE 20 may pass through the BBU 101, the RRU 102 (for example, a service interface of the RRU 102), the coupling unit 103, and the antenna unit 104. Finally, the base station 10 may send the service data to the UE 20 through a transmit channel of the base station 10, and the UE 20 may receive the service data through a receive channel of the UE 20. The service data is, for example, but is not limited to, audio data, text data, and video data.

The correction interface of the RRU 102 is configured to transmit a correction signal. The correction signal is for correction of an amplitude, a delay, and an initial phase of a transmit channel of the base station 10. Currently, most correction signals are sequences customized by the base station 10. The RRU 102 sends the correction signal to the coupling unit 103 through the correction interface, and then the base station 10 corrects an amplitude, an initial phase, and a delay of a transmit channel of the base station 10 at the coupling unit 103 based on the correction signal. However, the coupling unit 103 is usually encapsulated with the RRU 102, and there is still a feeder between the coupling unit 103 and the antenna unit 104. The feeder still affects a related parameter of the transmit channel after correction at the coupling unit 103. The feeder has little impact on the amplitude, and the delay may be measured in advance for compensation. However, a change of the initial phase is greatly affected by the feeder. Consequently, an initial phase error obtained through correction is still large. In order to avoid impact of the feeder, the coupling unit 103 usually needs to be disposed at the antenna unit 104. Consequently, a structure of the base station needs to be changed, causing additional hardware costs.

Therefore, to further correct an initial phase of a transmit channel and reduce an initial phase error without changing a structure of the base station, and to avoid additional hardware costs, an embodiment of this application provides a method for implementing transmit channel initial phase correction based on a large amount of downlink channel information fed back by the UE. For details, refer to descriptions in FIG. 2.

Figure 2:
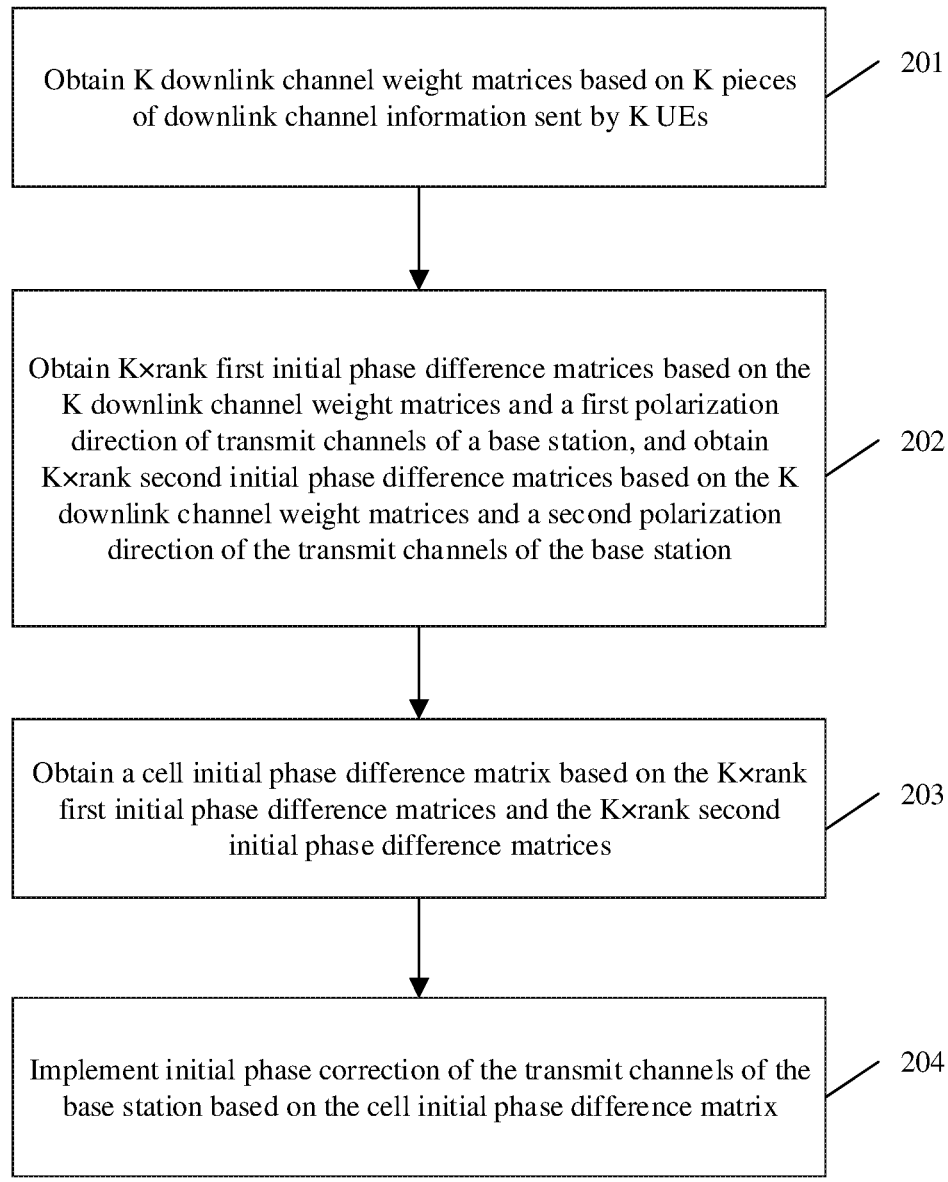
FIG. 2 is a schematic flowchart of a transmit channel initial phase correction method according to an embodiment of this application.

FIG. 2 shows a transmit channel initial phase correction method according to an embodiment of this application. The method may be implemented based on the system shown in FIG. 1B. The method may be applied to the base station 10 shown in FIG. 1A and FIG. 1B. The method includes but is not limited to the following steps.

Step S201: A base station obtains K downlink channel weight matrices based on K pieces of downlink channel information sent by K UEs.

Specifically, the base station may have a plurality of cells. The K UEs are all in any one of the plurality of cells, and the cell may be subsequently referred to as a first cell. The K UEs are some or all UEs accessing the first cell. The K pieces of downlink channel information are downlink channel information corresponding to the first cell.

Specifically, the downlink channel information is fed back by the UE in response to a preset reference signal sent by the base station. The preset reference signal is sent by the base station to the UE, and passes through a coupling unit and an antenna unit of the base station and a feeder between the coupling unit and the antenna unit inside the base station. Therefore, the downlink channel information is fed back by the UE based on an actual structure of the base station, and impact of the feeder between the coupling unit and the antenna unit of the base station on an initial phase of a transmit channel of the base station is considered. The preset reference signal is, for example, but is not limited to, a channel state information reference signal (CSI-RS).

Specifically, the downlink channel information includes but is not limited to at least one precoding matrix indicator (PMI) fed back by the UE and/or a sounding reference signal (SRS) fed back by the UE. The SRS fed back by the UE through an uplink channel may be used by the base station to obtain a downlink channel characteristic based on reciprocity between an uplink channel and a downlink channel, to obtain a corresponding downlink channel matrix.

In some embodiments, the downlink channel information may be a codebook fed back by the UE. The downlink channel information may include a plurality of PMIs that are stored by the UE and that indicate a beam direction, and a mapping manner for obtaining corresponding downlink channel weight matrices based on the plurality of PMIs. The base station may obtain the downlink channel characteristic based on the codebook fed back by the UE, and obtain a corresponding downlink channel weight matrix.

In some embodiments, the downlink channel information may be at least one optimal PMI fed back by the UE. The at least one optimal PMI fed back by the UE may be at least one PMI obtained by the UE from a codebook of the UE according to a preset rule. For example, the at least one optimal PMI fed back by the UE is a PMI sent by the UE in response to the CSI-RS sent by the base station. The CSI-RS may be a product of a pilot signal and a preset weighting matrix. The base station may perform, by using a channel reconstruction technology, joint processing on the at least one optimal PMI fed back by the UE in time domain or frequency domain, to obtain the downlink channel characteristic and obtain a corresponding downlink channel weight matrix.

The following uses any UE (where the UE may be a $k^{th}$ UE) in the K UEs as an example to describe a process of obtaining the downlink channel weight matrix based on the downlink channel information. k is greater than or equal to 1, and a value range of k is [1, K].

For example, the base station may obtain a corresponding downlink channel weight matrix based on a codebook fed back by the $k^{th}$ UE. The downlink channel weight matrix corresponding to the $k^{th}$ UE is an $N_T \times rank$-dimensional matrix, and may be represented as $W^k \in \mathbb{C}^{N_T \times rank}$. The rank is a quantity of signal streams received by the UE, or may be a maximum quantity of signal streams that can be simultaneously transmitted between the base station and the UE served by the base station on a time-frequency resource block. The quantity of signal streams is related to a channel capability. The quantity of signal streams is less than or equal to $\min\{N_R, N_T\}$. $N_T$ is a quantity of transmit channels of the base station, and $N_R$ is a quantity of receive channels of the UE.

For example, the base station may obtain, by using the channel reconstruction technology, a corresponding downlink channel weight matrix $W^k$ based on at least one optimal PMI fed back by the $k^{th}$ UE.

For example, the base station may obtain, based on an SRS fed back by the $k^{th}$ UE through an uplink channel, a downlink channel matrix corresponding to the $k^{th}$ UE. The downlink channel matrix corresponding to the $k^{th}$ UE is an $N_R \times N_T$-dimensional matrix, and may be represented as $H_{RT}^k \in \mathbb{C}^{N_R \times N_T}$, where $\mathbb{C}$ indicates that an element in the matrix is a complex number. Then, the base station may perform singular value decomposition (SVD) on the downlink channel matrix $H_{RT}$ corresponding to the $k^{th}$ UE, to obtain largest first rank right singular vectors. The largest first rank right singular vectors are the downlink channel weight matrix $W^k$ corresponding to the $k^{th}$ UE. One right singular vector includes $N_T$ elements. A detailed process of obtaining the downlink channel weight matrix $W^k$ based on the downlink channel matrix $H_{RT}$ is specifically as follows:

Specifically, the base station may perform SVD on the downlink channel matrix $H_{RT}$ of the $k^{th}$ UE to obtain the following:

$$H_{RT}^k = V_{RR}^k \cdot \Lambda_{RT}^k \cdot (U_{TT}^k)^H.$$

$V_{RR}^k$ is an $N_R \times N_R$-dimensional matrix, $\Lambda_{RT}^k$ is an $N_R \times N_T$-dimensional matrix, and $U_{TT}^k$ is an $N_T \times N_T$-dimensional matrix. A superscript H of $(U_{TT}^k)^H$ represents a conjugate transposition operation of a matrix. To be specific, $(U_{TT}^k)^H$ is a conjugate transposition matrix of $U_{TT}^k$. $(U_{TT}^k)^H \cdot U_{TT}^k = I_T$, where $I_T$ is an $N_T$-order unit matrix. Elements on a diagonal of $\Lambda_{RT}^k$ are singular values of $H_{RT}^k$, and columns of $V_{RR}^k$ and $U_{TT}^k$ are respectively left singular vectors and right singular vectors in the singular values. The downlink channel weight matrix $W^k$ corresponding to the $k^{th}$ UE is the largest first rank right singular vectors in $\theta_{TT}^k$. For example, if the singular values are arranged in descending order, and the vector $U_{T,p}$ in a $p^{th}$ column in $U_{TT}^k$ is a right singular vector corresponding to a $p^{th}$ largest singular value in $\Lambda_{RT}^k$, $W^k$ includes right singular vectors in the first rank columns in $U_{TT}^k$, and $W^k$ may be represented as follows:

$$W^k=[u_{T,1}\ u_{T,2}\ \ldots\ u_{T,p}\ \ldots\ u_{T,rank}].$$

p is a positive integer, and a value range of p is [1, rank].

In this embodiment of this application, a manner in which the base station obtains downlink channel weight matrices corresponding to the remaining K−1 UEs is similar to the manner of obtaining the downlink channel weight matrix $W^k$ corresponding to the $k^{th}$ UE. Details are not described herein again.

Step S202: The base station obtains K×rank first initial phase difference matrices based on the K downlink channel weight matrices and a first polarization direction of the transmit channels of the base station, and obtains K×rank second initial phase difference matrices based on the K downlink channel weight matrices and a second polarization direction of the transmit channels of the base station.

Specifically, the transmit channels of the base station may include transmit channels of M rows and N columns whose polarization directions are the first polarization direction, and transmit channels of M rows and N columns whose polarization directions are the second polarization direction. The first polarization direction and the second polarization direction are different. For example, the first polarization direction is horizontal polarization, and the second polarization direction is vertical polarization.

Specifically, the transmit channels of M rows and N columns whose polarization directions are the first polarization direction may be referred to as transmit channels in a first polarization plane, and the transmit channels of M rows and N columns whose polarization directions are the second polarization direction may be referred to as transmit channels in a second polarization plane. The first initial phase difference matrix corresponds to the first polarization plane, and the second initial phase difference matrix corresponds to the second polarization plane. The first initial phase difference matrix and the second initial phase difference matrix are both M×N-dimensional matrices. $N_T=2\times M\times N$, and both M and N are positive integers.

Figure 3:
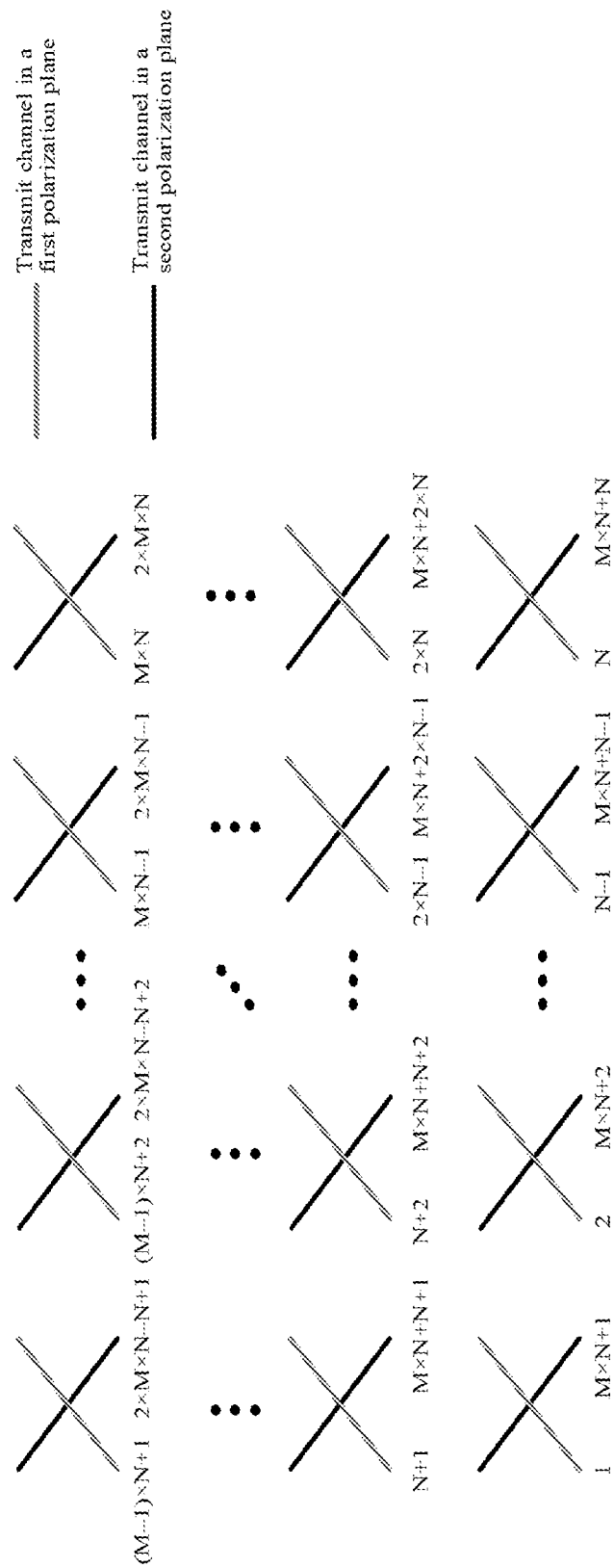
FIG. 3 to FIG. 9 are some schematic diagrams of arrangements of transmit channels of a base station according to embodiments of this application.
Figure 4:
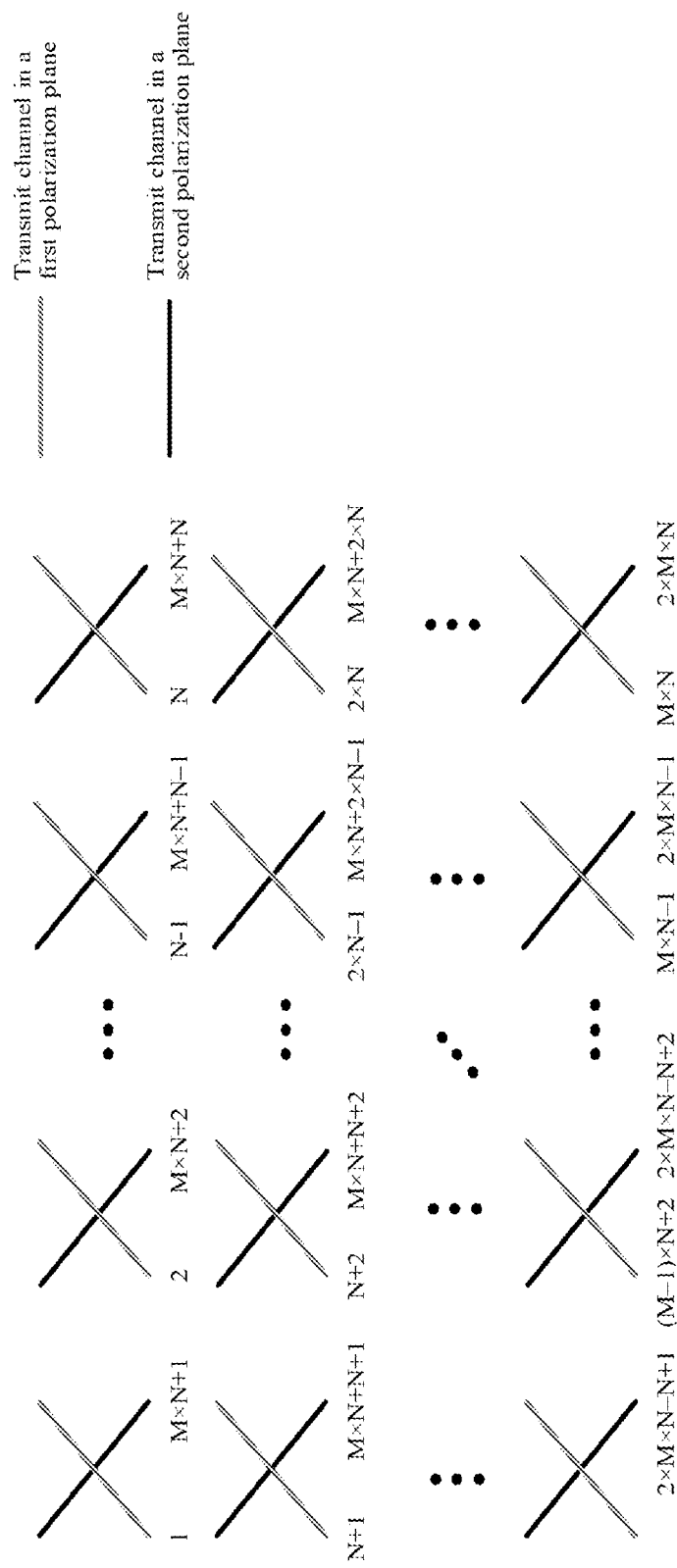

For a specific example of a structure of the transmit channel of the base station, refer to the following schematic diagrams of arrangements of transmit channels shown in FIG. 3 and FIG. 4.

As shown in FIG. 3, the transmit channels of the base station are sequentially the first row, the second row, . . . , and an $M^{th}$ row from bottom to top, and are sequentially the first column, the second column, . . . , and an $N^{th}$ column from left to right. In the first polarization plane, a transmit channel whose sequence number is 1 in the lower left corner is a transmit channel in the first row and the first column. The rest may be deduced by analogy. A transmit channel whose sequence number is N in the lower right corner is a transmit channel in the first row and the $N^{th}$ column, a transmit channel whose sequence number is (M−1)×N+1 in the upper left corner is a transmit channel in the $M^{th}$ row and the first column, and a transmit channel whose sequence number is M×N in the upper right corner is a transmit channel in the $M^{th}$ row and the $N^{th}$ column. Similarly, in the second polarization plane, a transmit channel whose sequence number is M×N+1 in the lower left corner is a transmit channel in the first row and the first column. The rest may be deduced by analogy. A transmit channel whose sequence number is M×N+N in the lower right corner is a transmit channel in the first row and the $N^{th}$ column, a transmit channel whose sequence number is 2×M×N−N+1 in the upper left corner is a transmit channel in the $M^{th}$ row and the first column, and a transmit channel whose sequence number is 2×M×N in the upper right corner is a transmit channel in the $M^{th}$ row and the $N^{th}$ column.

Optionally, as shown in FIG. 4, the transmit channels of the base station may alternatively be sequentially the first row, the second row, . . . , and the $M^{th}$ row from top to bottom, and are sequentially the first column, the second column, . . . , and the $N^{th}$ column from left to right. In the first polarization plane, a transmit channel whose sequence number is 1 in the upper left corner is a transmit channel in the first row and the first column. The rest may be deduced by analogy. A transmit channel whose sequence number is N in the upper right corner is a transmit channel in the first row and the $N^{th}$ column, a transmit channel whose sequence number is (M−1)×N+1 in the lower left corner is a transmit channel in the $M^{th}$ row and the first column, and a transmit channel whose sequence number is M×N in the lower right corner is a transmit channel in the $M^{th}$ row and the $N^{th}$ column. Similarly, in the second polarization plane, a transmit channel whose sequence number is M×N+1 in the upper left corner is a transmit channel in the first row and the first column. The rest may be deduced by analogy. A transmit channel whose sequence number is M×N+N in the upper right corner is a transmit channel in the first row and the $N^{th}$ column, a transmit channel whose sequence number is 2×M×N−N+1 in the lower left corner is a transmit channel in the $M^{th}$ row and the first column, and a transmit channel whose sequence number is 2×M×N in the lower right corner is a transmit channel in the $M^{th}$ row and the $N^{th}$ column.

This is not limited to the manners shown in FIG. 3 and FIG. 4. During specific implementation, the transmit channels of the base station may alternatively be sequentially the first row, the second row, . . . , and the $M^{th}$ row from bottom to top, and sequentially the first column, the second column, . . . , and the $N^{th}$ column from right to left. In this case, in the first polarization plane and the second polarization plane, transmit channels corresponding to the lower right corner are transmit channels in the first row and the first column, transmit channels corresponding to the lower left corner are transmit channels in the first row and the $N^{th}$ column, transmit channels corresponding to the upper right corner are transmit channels in the Mt row and the first column, and transmit channels corresponding to the upper left corner are transmit channels in the $M^{th}$ row and the $N^{th}$ column. The transmit channels of the base station may alternatively be sequentially the first row, the second row, . . . , and the $M^{th}$ row from top to bottom, and sequentially the first column, the second column, . . . , and the $N^{th}$ column from right to left. In this case, in the first polarization plane and the second polarization plane, transmit channels corresponding to the upper right corner are transmit channels in the first row and the first column, transmit channels corresponding to the upper left corner are transmit channels in the first row and the $N^{th}$ column, transmit channels corresponding to the lower right corner are transmit channels in the $M^{th}$ row and the first column, and transmit channels corresponding to the lower left corner are transmit channels in the $M^{th}$ row and the $N^{th}$ column. This is not limited in this embodiment of this application.

This embodiment of this application is described by using an example in which the transmit channels of the base station are arranged in the arrangement order shown in FIG. 3.

The following uses the $k^{th}$ UE as an example to describe a process of obtaining the first initial phase difference matrix and the second initial phase difference matrix based on the downlink channel weight matrix.

Specifically, the base station may first obtain, based on the downlink channel weight matrix $W^k$ corresponding to the $k^{th}$ UE and the first polarization direction, rank first phase matrices corresponding to the $k^{th}$ UE, and obtain, based on the downlink channel weight matrix $W^k$ corresponding to the $k^{th}$ UE and the second polarization direction, rank second phase matrices corresponding to the $k^{th}$ UE. Then, the base station may obtain, based on the rank first phase matrices corresponding to the $k^{th}$ UE, rank first initial phase difference matrices corresponding to the $k^{th}$ UE, and obtain, based on the rank second phase matrices corresponding to the $k^{th}$ UE, rank second initial phase difference matrices corresponding to the $k^{th}$ UE. The first phase matrices and the second phase matrices are all M×N-dimensional matrices.

It should be noted that the downlink channel weight matrix $W^k$ corresponding to the $k^{th}$ UE includes weights of rank streams. A weight of an $r^{th}$ stream is a vector $u_{T,r}$ in an $r^{th}$ column in $W^k$, where r is a positive integer, and a value range of r is [1, rank]. The following uses the weight of the $r^{th}$ stream in the downlink channel weight matrix $W^k$ as an example to describe a process of obtaining the first initial phase difference matrix and the second initial phase difference matrix based on the downlink channel weight matrix.

First, the base station may split the weight of the $r^{th}$ stream (namely, the vector $u_{T,r}$ in the $r^{th}$ column) in $W^k$, and reserve only a phase value, to obtain a first phase matrix and a second phase matrix. A first phase matrix corresponding to the $r^{th}$ stream may be represented as $\varphi^+$, and is specifically as follows:

$$\varphi^+ = \begin{bmatrix} \varphi_{M,1} & \varphi_{M,2} & \cdots & \cdots & \cdots & \varphi_{M,N} \\ \vdots & \vdots & \ddots & \vdots & \ddots & \vdots \\ \varphi_{m,1} & \varphi_{m,2} & \cdots & \varphi_{m,n} & \cdots & \varphi_{m,N} \\ \vdots & \vdots & \ddots & \vdots & \ddots & \vdots \\ \varphi_{1,1} & \varphi_{1,2} & \cdots & \cdots & \cdots & \varphi_{1,N} \end{bmatrix}.$$

A value range of m is [1, M], a value range of n is [1, N], and both m and n are positive integers. $\varphi_{m,n}$ is a phase of a transmit channel in an $m^{th}$ row and an $n^{th}$ column in the first polarization plane corresponding to the weight of the $r^{th}$ stream. For example, $\varphi_{1,1}$ represents a phase of a transmit channel (namely, a transmit channel whose sequence number is 1 in FIG. 3) that is in the first row and the first column in the first polarization plane and that corresponds to the weight of the $r^{th}$ stream.

Similarly, the second phase matrix corresponding to the $r^{th}$ stream may be represented as $\varphi^-$, and is specifically as follows:

$$\varphi^- = \begin{bmatrix} \varphi'_{M,1} & \varphi'_{M,2} & \cdots & \cdots & \cdots & \varphi'_{M,N} \\ \vdots & \vdots & \ddots & \vdots & \ddots & \vdots \\ \varphi'_{m,1} & \varphi'_{m,2} & \cdots & \varphi'_{m,n} & \cdots & \varphi'_{m,N} \\ \vdots & \vdots & \ddots & \vdots & \ddots & \vdots \\ \varphi'_{1,1} & \varphi'_{1,2} & \cdots & \cdots & \cdots & \varphi'_{1,N} \end{bmatrix}.$$

$\varphi_{m,n}'$ represents a phase of a transmit channel that is in an $m^{th}$ row and an $n^{th}$ column in the second polarization plane and that corresponds to the weight of the $r^{th}$ stream. For example, $\varphi_{1,1}'$ represents a phase of a transmit channel (namely, a transmit channel whose sequence number is M×N+1 in FIG. 3) that is in the first row and the first column in the second polarization plane and that corresponds to the weight of the $r^{th}$ stream.

Then, the base station may obtain, based on the first phase matrix $\varphi^+$ corresponding to the weight of the $r^{th}$ stream, the first initial phase difference matrix corresponding to the weight of the $r^{th}$ stream, and obtain, based on the second phase matrix $\varphi^-$ corresponding to the weight of the $r^{th}$ stream, the second initial phase difference matrix corresponding to the weight of the $r^{th}$ stream. In some embodiments, when determining the first initial phase difference matrix and the second initial phase difference matrix, the base station may perform calculation by using transmit channels in an $x^{th}$ row and a $y^{th}$ column in the first phase plane and the second phase plane as references. A value range of x is [1, M], and a value range of y is [1, N].

The first initial phase difference matrix determined by the base station by using the transmit channels in the $x^{th}$ row and the $y^{th}$ column in the first phase plane and the second phase plane as references may be represented as $\theta^+$, which is specifically as follows:

$$\theta^+ = (-1) \times \begin{bmatrix} \theta_{M,1} & \theta_{M,2} & \cdots & \cdots & \cdots & \theta_{M,N} \\ \vdots & \vdots & \ddots & \vdots & \ddots & \vdots \\ \theta_{m,1} & \theta_{m,2} & \cdots & \theta_{m,n} & \cdots & \theta_{m,N} \\ \vdots & \vdots & \ddots & \vdots & \ddots & \vdots \\ \theta_{1,1} & \theta_{1,2} & \cdots & \cdots & \cdots & \theta_{1,N} \end{bmatrix}.$$

$\theta_{m,n}$ represents a first phase compensation value of a transmit channel that is in an $m^{th}$ row and an $n^{th}$ column in the first polarization plane and that corresponds to the weight of the $r^{th}$ stream. For example, $\theta_{1,1}$ represents a phase compensation value of a transmit channel (namely, a transmit channel whose sequence number is 1 in FIG. 3) that is in the first row and the first column in the first polarization plane and that corresponds to the weight of the $r^{th}$ stream. A calculation formula of $\theta_{m,n}$ is specifically as follows:

$\theta_{m,n} = (n-x) \times \Delta_H + (m-y) \times \Delta_V + \varphi_{x,y} - \varphi_{m,n}.$ For example, when transmit channels in the first row and the first column in the first phase plane and the second phase plane are used as references, that is, x=1 and y=1, the calculation formula of $\theta_{m,n}$ is specifically as follows:

$\theta_{m,n} = (n-1) \times \Delta_H + (m-1) \times \Delta_V + \varphi_{1,1} - \varphi_{m,n}.$ Calculation formulas of $\Delta_H$ and $\Delta_V$ are specifically as follows:

$\Delta_H = \varphi_{x,y+1} - \varphi_{x,y}$; and $\Delta_V = \varphi_{x+1,y} - \varphi_{x,y}.$ For example, when transmit channels in the first row and the first column in the first phase plane and the second phase plane are used as references, that is, x=1 and y=1, the calculation formulas of $\Delta_H$ and $\Delta_V$ are specifically as follows:

$\Delta_H = \varphi_{1,2} - \varphi_{1,1}$; and $\Delta_V = \varphi_{2,1} - \varphi_{1,1}.$ Similarly, the second initial phase difference matrix determined by the base station by using the transmit channels in the $x^{th}$ row and the $y^{th}$ column in the first phase plane and the second phase plane as references may be represented as $\theta^-$, which is specifically as follows:

$$\theta^- = (-1) \times \begin{bmatrix} \theta'_{M,1} & \theta'_{M,2} & \cdots & \cdots & \cdots & \theta'_{M,N} \\ \vdots & \vdots & \ddots & \vdots & \ddots & \vdots \\ \theta'_{m,1} & \theta'_{m,2} & \cdots & \theta'_{m,n} & \cdots & \theta'_{m,N} \\ \vdots & \vdots & \ddots & \vdots & \ddots & \vdots \\ \theta'_{1,1} & \theta'_{1,2} & \cdots & \cdots & \cdots & \theta'_{1,N} \end{bmatrix}.$$

$\theta_{m,n}'$ represents a second phase compensation value of a transmit channel that is in an $m^{th}$ row and an $n^{th}$ column in the second polarization plane and that corresponds to the weight of the $r^{th}$ stream. For example, $\theta_{1,1}'$ represents a phase compensation value of a transmit channel (namely, a transmit channel whose sequence number is M×N+1 in FIG. 3) that is in the first row and the first column in the second polarization plane and that corresponds to the weight of the $r^{th}$ stream. A calculation formula of $\theta_{m,n}'$ is specifically as follows:

$\theta_{m,n}' = (n-x) \times \Delta_H + (m-y) \times \Delta_V + \varphi_{x,y}' - \varphi_{m,n}'$.

For example, when transmit channels in the first row and the first column in the first phase plane and the second phase plane are used as references, that is, x=1 and y=1, the calculation formula of $\theta_{m,n}'$ is specifically as follows:

$\theta_{m,n}' = (n-1) \times \Delta_H + (m-1) \times \Delta_V + \varphi_{1,1}' - \varphi_{m,n}'$.

The first initial phase difference matrix $\theta^+$ and the second initial phase difference matrix $\theta^-$ corresponding to the weight of the $r^{th}$ stream may be combined into a user initial phase difference matrix corresponding to the weight of the $r^{th}$ stream. The user initial phase difference matrix corresponding to the weight of the $r^{th}$ stream may be represented as follows:

$[\theta^+, \theta^-] =$ $(-1) \times \begin{bmatrix} \theta_{M,1} & \theta_{M,2} & \cdots & \cdots & \cdots & \theta_{M,N} & \theta'_{M,1} & \theta'_{M,2} & \cdots & \cdots & \cdots & \theta'_{M,N} \\ \vdots & \vdots & \ddots & \vdots & \ddots & \vdots & \vdots & \vdots & \ddots & \vdots & \ddots & \vdots \\ \theta_{m,1} & \theta_{m,2} & \cdots & \theta_{m,n} & \cdots & \theta_{m,N} & \theta'_{m,1} & \theta'_{m,2} & \cdots & \theta'_{m,n} & \cdots & \theta'_{m,N} \\ \vdots & \vdots & \ddots & \vdots & \ddots & \vdots & \vdots & \vdots & \ddots & \vdots & \ddots & \vdots \\ \theta_{1,1} & \theta_{1,2} & \cdots & \cdots & \cdots & \theta_{1,N} & \theta'_{1,1} & \theta'_{1,2} & \cdots & \cdots & \cdots & \theta'_{1,N} \end{bmatrix}.$ In this embodiment of this application, a manner in which the base station processes weights of the remaining rank−1 streams in the downlink channel weight matrix $W^k$ corresponding to the $k^{th}$ UE is similar to the foregoing manner of processing the weight of the $r^{th}$ stream. Details are not described herein again. A manner in which the base station processes downlink channel weight matrices corresponding to the remaining K−1 UEs is similar to the manner of processing the downlink channel weight matrix corresponding to the $k^{th}$ UE. Details are not described herein again. Finally, the base station may obtain the K×rank first initial phase difference matrices and the K×rank second initial phase difference matrices based on the K downlink channel weight matrices.

Step S203: The base station obtains a cell initial phase difference matrix based on the K×rank first initial phase difference matrices and the K×rank second initial phase difference matrices.

Specifically, the cell initial phase difference matrix includes $N_T$ elements. Any element in the cell initial phase difference matrix corresponds to one transmit channel in the transmit channels of the base station and is for initial phase correction of the transmit channel.

Specifically, the cell initial phase difference matrix may include M×N elements corresponding to transmit channels of M rows and N columns in the first polarization plane, and M×N elements corresponding to transmit channels of M rows and N columns in the second polarization plane. An element that corresponds to a transmit channel in an $m^{th}$ row and an $n^{th}$ column in the first polarization plane and that is in the M×N elements corresponding to the transmit channels of M rows and N columns in the first polarization plane is obtained by the base station by performing filtering on the first phase compensation value $\theta_{m,n}$ in the K×rank first initial phase difference matrices for first preset duration. An element that corresponds to a transmit channel in an $m^{th}$ row and an $n^{th}$ column in the second polarization plane and that is in the M×N elements corresponding to the transmit channels of M rows and N columns in the second polarization plane is obtained by the base station by performing filtering on the second phase compensation value $\theta_{m,n}'$ in the K×rank second initial phase difference matrices for second preset duration. The first preset duration and the second preset duration may be equal or not equal. The filtering processing method may be, but is not limited to, a direct average filtering method or an alpha mean filtering method.

For example, the cell initial phase difference matrix P may be represented as follows:

$$P = \begin{bmatrix} \rho_{M,1} & \rho_{M,2} & \cdots & \cdots & \cdots & \rho_{M,N} & \rho'_{M,1} & \rho'_{M,2} & \cdots & \cdots & \cdots & \rho'_{M,N} \\ \vdots & \vdots & \ddots & \vdots & \ddots & \vdots & \vdots & \vdots & \ddots & \vdots & \ddots & \vdots \\ \rho_{m,1} & \rho_{m,2} & \cdots & \rho_{m,n} & \cdots & \rho_{m,N} & \rho'_{m,1} & \rho'_{m,2} & \cdots & \rho'_{m,n} & \cdots & \rho'_{m,N} \\ \vdots & \vdots & \ddots & \vdots & \ddots & \vdots & \vdots & \vdots & \ddots & \vdots & \ddots & \vdots \\ \rho_{1,1} & \rho_{1,2} & \cdots & \cdots & \cdots & \rho_{1,N} & \rho'_{1,1} & \rho'_{1,2} & \cdots & \cdots & \cdots & \rho'_{1,N} \end{bmatrix}^T.$$

The superscript T of the matrix P represents matrix transpose. $\rho_{m,n}$ is for initial phase correction of the transmit channel in the $m^{th}$ row and the $n^{th}$ column in the first polarization plane, and is specifically a phase compensation value of the transmit channel in the $m^{th}$ row and the $n^{th}$ column in the first polarization plane. $\rho_{m,n}$ may be obtained by the base station by performing filtering on the first phase compensation value $\theta_{m,n}$ in the K×rank first initial phase difference matrices $\theta^+$ for first preset duration.

Similarly, $\rho_{m,n}'$ is for initial phase correction of the transmit channel in the $m^{th}$ row and the $n^{th}$ column in the second polarization plane, and is specifically a phase compensation value of the transmit channel in the $m^{th}$ row and the $n^{th}$ column in the second polarization plane. $\rho_{m,n}'$ may be obtained by the base station by performing filtering on the second phase compensation value $\theta_{m,n}'$ in the K×rank second initial phase difference matrices $\theta^-$ for second preset duration.

S204: The base station implements initial phase correction of the transmit channels of the base station based on the cell initial phase difference matrix.

For example, it is assumed that the cell initial phase difference matrix obtained in S203 is P. In this case, the base station may implement initial phase correction of the transmit channel in the $m^{th}$ row and the $n^{th}$ column in the first polarization plane based on $\rho_{m,n}$, and implement initial phase correction of the transmit channel in the $m^{th}$ row and the $n^{th}$ column in the second polarization plane based on $\rho_{m,n}'$.

It should be noted that the K pieces of downlink channel information are fed back by the K UEs at a moment (which may be referred to as a moment t). Therefore, the K downlink channel weight matrices, the K×rank first phase matrices, the K×rank second phase matrices, the K×rank first initial phase difference matrices, the K×rank second initial phase difference matrices, and the cell initial phase difference matrix all correspond to the moment t. In this case, the cell initial phase difference matrix is used by the base station to implement initial phase correction of a transmit channel corresponding to the first cell at the moment t.

Therefore, based on the downlink channel information fed back by the K UEs at different moments, the cell initial phase difference matrix obtained by the base station may be different. Based on the downlink channel information fed back by the K UEs at different moments, the cell initial phase difference matrices obtained by the base station are configured to implement initial phase correction of the transmit channel corresponding to the first cell at different moments.

In the method described in FIG. 2, the base station obtains the cell initial phase difference matrix based on the K pieces of downlink channel information sent by the K UEs. The downlink channel information is fed back by the UE in response to a preset reference signal sent by the base station. The preset reference signal is sent by the base station to the UE, and passes through a coupling unit and an antenna unit of the base station and a feeder between the coupling unit and the antenna unit inside the base station. Therefore, the base station implements initial phase correction of the transmit channels of the base station by using the cell initial phase difference matrix, and impact of the feeder between the coupling unit and the antenna unit on initial phases of the transmit channels is fully considered. In this way, the initial phases of the transmit channels can be further corrected without changing a hardware structure of the base station, to reduce an initial phase correction error while avoiding additional hardware costs.

For ease of understanding embodiments of this application, the following describes the method shown in FIG. 2 by using a base station of a 4T structure and a base station of an 8T structure as an example. 4T indicates that a quantity of transmit channels of the base station is 4, and 8T indicates that a quantity of transmit channels of the base station is 8.

First, the 4T base station is used as an example for description. When $N_T = 2 \times M \times N = 4$, values of M and N may be in the following two cases.

Figure 5:
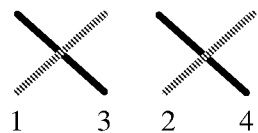

Case 1: M=1, and N=2. Based on the schematic diagram of an arrangement of the transmit channels shown in FIG. 3, for an example of a structure of the transmit channels of the base station, refer to the schematic diagram of an arrangement of transmit channels shown in FIG. 5. As shown in FIG. 5, transmit channels in the first polarization plane include a transmit channel in the first row and the first column (namely, a transmit channel whose sequence number is 1) and a transmit channel in the first row and the second column (namely, a transmit channel whose sequence number is 2). Transmit channels in the second polarization plane include a transmit channel in the first row and the first column (namely, a transmit channel whose sequence number is 3) and a transmit channel in the first row and the second column (namely, a transmit channel whose sequence number is 4).

Figure 6:
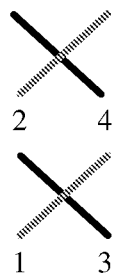

Case 2: M=2, and N=1. Based on the schematic diagram of an arrangement of the transmit channels shown in FIG. 3, for an example of a structure of the transmit channels of the base station, refer to the schematic diagram of an arrangement of transmit channels shown in FIG. 6. As shown in FIG. 6, transmit channels in the first polarization plane include a transmit channel in the first row and the first column (namely, a transmit channel whose sequence number is 1) and a transmit channel in the second row and the first column (namely, a transmit channel whose sequence number is 2). Transmit channels in the second polarization plane include a transmit channel in the first row and the first column (namely, a transmit channel whose sequence number is 3) and a transmit channel in the second row and the first column (namely, a transmit channel whose sequence number is 4).

The following describes the method shown in FIG. 2 by using the foregoing case 1 as an example. In addition, the $k^{th}$ UE is used as an example for description.

First, based on the descriptions of S201 in FIG. 2, the base station may obtain, based on the downlink channel information sent by the $k^{th}$ UE at the moment t, the downlink channel weight matrix corresponding to the $k^{th}$ UE.

It should be noted that the downlink channel information of the first cell sent by the $k^{th}$ UE to the base station is separately sent by the $k^{th}$ UE on S subbands. S is a positive integer. A sum of bandwidths of the S subbands is a total bandwidth of a downlink channel, and one subband may include at least one time-frequency resource block. Optionally, S may be 1. To be specific, the $k^{th}$ UE sends the downlink channel information of the first cell to the base station by using one subband (which may also be referred to as a fullband in this case), and the subband includes all RBs of the downlink channel.

The following uses an example in which the downlink channel information fed back by the $k^{th}$ UE is information fed back at the t moment and on an $s^{th}$ subband for description. A value range of s is [1, S], and s is a positive integer.

Specifically, the base station may obtain the corresponding downlink channel weight matrix $W_{t,s}^k$ based on the downlink channel information sent by the $k^{th}$ UE at the moment t and on the $s^{th}$ subband. An element $W_{t,s}^k[i][r]$ in $W_{t,s}^k$ is a weight of an $i^{th}$ transmit channel of the 4T base station in the weights of the $r^{th}$ stream at the moment t. i is a sequence number of the transmit channel. For an example of the sequence number, refer to sequence numbers in the schematic diagrams of arrangements of transmit channels shown in FIG. 3 to FIG. 6. For example, $W_{t,s}^k[1][r]$ represents a weight that corresponds to a transmit channel (namely, a transmit channel in the first row and the first column in the first polarization plane) whose sequence number is 1 in FIG. 5 and that is in the weight of the $r^{th}$ stream.

Second, based on the descriptions of S202 in FIG. 2, the base station may obtain corresponding rank first initial phase difference matrices based on the downlink channel weight matrix corresponding to the $k^{th}$ UE and the first polarization direction, and obtain corresponding rank second initial phase difference matrices based on the downlink channel weight matrix corresponding to the $k^{th}$ UE and the second polarization direction.

First, the base station may obtain the corresponding first phase matrix $\varphi^+$ and second phase matrix $\varphi^-$ based on the weight value of the $r^{th}$ stream in the downlink channel weight matrix $W_{t,s}^k$. The first phase matrix $\varphi^+$ corresponding to the weight of the $r^{th}$ stream in $W_{t,s}^k$ may be represented as follows:

$$\varphi^+ = [\varphi_{1,1} \varphi_{1,2}].$$

$\varphi_{1,1}$ represents a phase of a transmit channel (namely, a transmit channel whose sequence number is 1 in FIG. 5) that is in the first row and the first column in the first polarization plane and that corresponds to the weight of the $r^{th}$ stream in $W_{t,s}^{k}$. $\varphi_{1,2}$ represents a phase of a transmit channel (namely, a transmit channel whose sequence number is 2 in FIG. 5) that is in the first row and the second column in the first polarization plane and that corresponds to the weight of the $r^{th}$ stream in $W_{t,s}^{k}$.

Similarly, the second phase matrix $\varphi^{-}$ corresponding to the weight of the $r^{th}$ stream in $W_{t,s}^{k}$ may be represented as follows:

$$\varphi^{-}=[\varphi_{1,1}'\varphi_{1,2}'].$$

$\varphi_{1,1}'$ represents a phase of a transmit channel (namely, a transmit channel whose sequence number is 3 in FIG. 5) that is in the first row and the first column in the second polarization plane and that corresponds to the weight of the $r^{th}$ stream in $W_{t,s}^{k}$. $\varphi_{1,2}'$ represents a phase of a transmit channel (namely, a transmit channel whose sequence number is 4 in FIG. 5) that is in the first row and the second column in the second polarization plane and that corresponds to the weight of the $r^{th}$ stream in $W_{t,s}^{k}$.

Then, the base station obtains, based on the first phase matrix $\varphi^{+}$ corresponding to the weight of the $r^{th}$ stream in $W_{t,s}^{k}$, the corresponding first initial phase difference matrix $\theta^{+}$, and obtains, based on the second phase matrix $\varphi^{-}$ corresponding to the weight of the $r^{th}$ stream in $W_{t,s}^{k}$, the corresponding second initial phase difference matrix $\theta^{-}$. The first initial phase difference matrix $\theta^{+}$ corresponding to the weight of the $r^{th}$ stream in $W_{t,s}^{k}$ may be represented as follows:

$$\theta^{+}=(-1)\times[\theta_{1,1}\theta_{1,2}].$$

$\theta_{1,1}$ represents a phase compensation value of a transmit channel (namely, a transmit channel whose sequence number is 1 in FIG. 5) that is in the first row and the first column in the first polarization plane and that corresponds to the weight of the $r^{th}$ stream in $W_{t,s}^{k}$.

Next, calculation is performed by using transmit channels (namely, a transmit channel whose sequence number is 1 and a transmit channel whose sequence number is 3 in FIG. 5) in the first row and the first column in the first phase plane and the second phase plane as references, that is, by using x=1 and y=1 as an example. $\Delta_H$ and $\Delta_V$ are first calculated, and are specifically as follows:

$$\Delta_H=\varphi_{1,2}-\varphi_{1,1};\text{ and}$$

$$\Delta_V=\varphi_{2,1}-\varphi_{1,1}.$$

A calculation process of $\theta_{1,1}$ is specifically as follows:

$$\theta_{1,1}=(1-1)\times\Delta_H+(1-1)\times\Delta_V+\varphi_{1,1}-\varphi_{1,1}=0.$$

$\theta_{1,2}$ represents a phase compensation value of a transmit channel (namely, a transmit channel whose sequence number is 2 in FIG. 5) that is in the first row and the second column in the first polarization plane and that corresponds to the weight of the $r^{th}$ stream in $W_{t,s}^{k}$. A calculation process of $\theta_{1,2}$ is specifically as follows:

$$\theta_{1,2}=(2-1)\times\Delta_H+(1-1)\times\Delta_V+\varphi_{1,1}-\varphi_{1,2}=\varphi_{1,2}-\varphi_{1,1}+\varphi_{1,1}-\varphi_{1,2}=0.$$

Similarly, the second initial phase difference matrix $\theta^{-}$ corresponding to the weight of the $r^{th}$ stream in $W_{t,s}^{k}$ may be represented as follows:

$$\theta^{-}=(-1)\times[\theta_{1,1}'\theta_{1,2}'].$$

$\theta_{1,1}'$ represents a phase compensation value of a transmit channel (namely, a transmit channel whose sequence number is 3 in FIG. 5) that is in the first row and the first column in the second polarization plane and that corresponds to the weight of the $r^{th}$ stream in $W_{t,s}^{k}$. A calculation process of $\theta_{1,1}'$ is specifically as follows:

$$\theta_{1,1}'=(1-1)\times\Delta_H+(1-1)\times\Delta_V+\varphi_{1,1}'-\varphi_{1,1}'=0.$$

$\theta_{1,2}'$ represents a phase compensation value of a transmit channel (namely, a transmit channel whose sequence number is 4 in FIG. 5) that is in the first row and the second column in the second polarization plane and that corresponds to the weight of the $r^{th}$ stream in W. A calculation process of $\theta_{1,2}'$ is specifically as follows:

$$\theta_{1,2}'=(2-1)\times\Delta_H+(1-1)\times\Delta_V+\varphi_{1,1}'-\varphi_{1,2}'=\varphi_{1,2}-\varphi_{1,1}-\varphi_{1,2}'+\varphi_{1,1}'.$$

The first initial phase difference matrix $\theta^{+}$ and the second initial phase difference matrix $\theta^{-}$ corresponding to the weight of the $r^{th}$ stream may be combined into a user initial phase difference matrix corresponding to the weight of the $r^{th}$ stream in $W_{t,s}^{k}$. In this case, the user initial phase difference matrix corresponding to the weight of the $r^{th}$ stream in $W_{t,s}^{k}$ may be represented as follows:

$$[\theta^{+},\theta^{-}]=(-1)\times[\theta_{1,1}\theta_{1,2}\theta_{1,1}'\theta_{1,2}']=(-1)\times[0\ 0\ 0\ \varphi_{1,2}-\varphi_{1,1}-\varphi_{1,2}'+\varphi_{1,1}'].$$

In this embodiment of this application, for the downlink channel information fed back by the $k^{th}$ UE at the moment t, a manner in which the base station obtains a user initial phase difference matrix corresponding to the weights of the remaining rank−1 streams corresponding to the $s^{th}$ subband is similar to the foregoing manner in which the base station obtains the user initial phase difference matrix corresponding to the weights of the $r^{th}$ stream corresponding to the $s^{th}$ subband. Details are not described herein again. A manner in which the base station obtains initial phase difference matrices of rank users respectively corresponding to the remaining S−1 subbands is similar to the foregoing manner of obtaining initial phase difference matrices of rank users respectively corresponding to the $s^{th}$ subband, and details are not described herein again.

Based on the expression of the user initial phase difference matrix corresponding to the weight of the $r^{th}$ flow in $W_{t,s}^{k}$, it can be learned that for each user initial phase difference matrix, only corresponding $\theta_{1,2}'$ needs to be calculated. Specifically, S×rank phase compensation values $\theta_{1,2}'$ corresponding to the $k^{th}$ UE at the moment t and on the S subbands are summed up, and the complex value $\Delta_t^{k,n}=e^{j\theta'_{1,2}}$ that is of $\theta_{1,2}'$ corresponding to the $k^{th}$ UE at the moment t and that is obtained through estimation is as follows:

$$\Delta_t^{k}=\Sigma_{s=1}^{s=S}\Sigma_{r=1}^{r=rank}W_{t,s}^{k}[2][r]\cdot(W_{t,s}^{k}[1][r])^{*}\cdot(W_{t,s}^{k}[4][r])^{*}\cdot W_{t,s}^{k}[3][r].$$

$W_{t,s}^{k}[2][r]$ is a phase $\varphi_{1,2}$ of a transmit channel (namely, a transmit channel in the first row and the second column in the first polarization plane) whose sequence number is 2 in FIG. 5 and that corresponds to the weight of the $r^{th}$ stream in $W_{t,s}^{k}$. $W_{t,s}^{k}[1][r]$ is a phase $\varphi_{1,1}$ of a transmit channel (namely, a transmit channel in the first row and the first column in the first polarization plane) whose sequence number is 1 in FIG. 5 and that corresponds to the weight of the $r^{th}$ stream in $W_{t,s}^{k}$, the superscript * of $(W_{t,s}^{k}[1][r])^{*}$ represents matrix conjugation, and $(W_{t,s}^{k}[1][r])^{*}$ corresponds to $-\varphi_{1,1}$ in the foregoing expression of $\theta_{1,2}'$. $W_{t,s}^{k}[4][r]$ is a phase $\varphi_{1,2}'$ of a transmit channel (namely, a transmit channel in the first row and the second column in the second polarization plane) whose sequence number is 4 in FIG. 5 and that corresponds to the weight of the $r^{th}$ stream in $W_{t,s}{}^k$, and $(W_{t,s}{}^k[4][r])^*$ corresponds to $(-\varphi_{1,2}')$ in the foregoing expression of $\theta_{1,2}'$. $W_{t,s}{}^k[3][r]$ is a phase $\varphi_{1,1}'$ of a transmit channel (namely, a transmit channel in the first row and the first column in the second polarization plane) whose sequence number is 3 in FIG. 5 and that corresponds to the weight of the $r^{th}$ stream in $W_{t,s}{}^k$.

Finally, normalization processing is performed on $\Delta_t^k$ obtained through estimation, and only phase information is reserved, so that a user-level phase compensation value $\Delta_t^k$ that is of a transmit channel (namely, a transmit channel whose sequence number is 4 in FIG. 5) in the first row and the second column in the second polarization plane and that corresponds the downlink channel weight matrix $W_t^k$ corresponding to the $k^{th}$ UE can be obtained. $\Delta_t^k$ corresponds to the moment t. A calculation formula of $\Delta_t^k$ is specifically as follows:

$$\Delta_c^k = \frac{\Delta_t^k}{|\Delta_t^k|}.$$

In this embodiment of this application, a manner in which the base station obtains user-level phase compensation values of transmit channels (namely, the transmit channels whose sequence numbers are 4 in FIG. 5) in the first row and the second column in second polarization planes corresponding to the downlink channel weight matrices corresponding to the remaining K−1 UEs is similar to the foregoing manner of obtaining $\Delta_t^k$. Details are not described herein again.

Third, based on the descriptions of S203 in FIG. 2, the base station may obtain the cell initial phase difference matrix based on the K×rank first initial phase difference matrices and the K×rank second initial phase difference matrices.

Specifically, the base station may perform filtering for preset duration on the K user-level phase compensation values (namely, $\Delta_t^k$) that are of transmit channels in the first row and the second column in the second polarization planes and that are obtained in the foregoing second step, to obtain a cell-level phase compensation value that corresponds to the transmit channel (that is, the transmit channel whose sequence number is 4 in FIG. 5) in the first row and the second column in the second polarization plane and that is of the cell initial phase difference matrix. Based on the descriptions of S203 in FIG. 2, filtering duration for which the base station performs filtering on the user-level phase compensation value of the transmit channel in the first polarization plane may be first preset duration $T_1$. Filtering duration for which the base station performs filtering on the user-level phase compensation value (for example, $\Delta_t^k$) of the transmit channel in the second polarization plane may be second preset duration $T_2$. The first preset duration $T_1$ and the second preset duration $T_2$ may be equal or not equal.

For example, the base station processes, by using a direct average filtering method or an alpha mean filtering method, the K user-level phase compensation values that are of the transmit channel in the first row and the second column in the second polarization plane and that are obtained in the foregoing second step, and then performs normalization processing, and retains only the phase information.

Specifically, a calculation formula for performing processing by using the direct average filtering method is as follows:

$$\Delta_t = \sum\nolimits_{k=1}^{k=K} \Delta_t^k;$$

$$\Delta = \frac{1}{T_2} \sum\nolimits_{l=0}^{l=T_2-1} \Delta_{t-l}; \text{ and}$$

$$\Delta = \frac{\Delta}{|\Delta|}.$$

Specifically, a calculation formula for performing processing by using the alpha mean filtering method is as follows:

$$\Delta_t = \sum\nolimits_{k=1}^{k=K} \Delta_t^k;$$

$$\Delta = \alpha \times \frac{\Delta_t}{\Delta_t} + (1-\alpha) \times \Delta; \text{ and}$$

$$\Delta = \frac{\Delta}{|\Delta|}.$$

A value of $\alpha$ may be small, for example, may be, but is not limited to, 0.01 or 0.001. This is not limited in this embodiment of this application.

$\Delta$ obtained in the foregoing calculation manner is the cell-level phase compensation value $\rho_{1,2}'$ corresponding to the transmit channel (namely, the transmit channel in the first row and the second column in the second polarization plane) whose sequence number is 4 in FIG. 5 in the cell initial phase difference matrix P. Therefore, the cell initial phase difference matrix P may be represented as follows:

$$P = [1 \ 1 \ 1 \ \Delta^*]^T.$$

In the matrix P, an element (where a value of the element is 1) in the first row and the first column is used to compensate for an initial phase of the transmit channel (namely, the transmit channel in the first row and the first column in the first polarization plane) whose sequence number is 1 in FIG. 5. An element (where a value of the element is 1) in the second row and the first column is used to compensate for an initial phase of the transmit channel (namely, the transmit channel in the first row and the second column in the first polarization plane) whose sequence number is 2 in FIG. 5. Similarly, an element (where a value of the element is 1) in the third row and the first column is used to compensate for an initial phase of the transmit channel (namely, the transmit channel in the first row and the first column in the second polarization plane) whose sequence number is 3 in FIG. 5. An element (where a value of the element is $\Delta^*$) in the fourth row and the first column is used to compensate for an initial phase of the transmit channel (namely, the transmit channel in the first row and the second column in the second polarization plane) whose sequence number is 4 in FIG. 5.

Finally, based on the descriptions of S204 in FIG. 2, the base station may implement initial phase correction of the transmit channels of the 4T base station based on the cell initial phase difference matrix P obtained in the third step.

A processing procedure of the foregoing case 2 is the same as a processing procedure of the foregoing case 1, and details are not described herein again. It should be noted that positions of the transmit channels are variable. For example, positions of a transmit channel whose sequence number is originally 3 and a transmit channel whose sequence number is originally 4 may be interchanged. In this case, an element (where a value of the element is $\Delta^*$) in the fourth row and the first column of the cell initial phase difference matrix P may be used to compensate for an initial phase of the transmit channel (that is, the transmit channel whose sequence number is originally 3) whose sequence number is 4 after the positions are interchanged.

Then, the 8T base station is used as an example for description. When $N_T=2 \times M \times N=8$, values of M and N may be in the following three cases.

Figure 7:
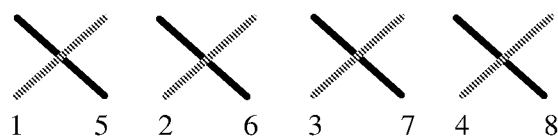

Case 1: M=1, and N=4. Based on the schematic diagram of an arrangement of the transmit channels shown in FIG. 3, for an example of a structure of the transmit channels of the base station, refer to the schematic diagram of an arrangement of transmit channels shown in FIG. 7. As shown in FIG. 7, transmit channels in the first polarization plane include a transmit channel in the first row and the first column (namely, a transmit channel whose sequence number is 1), a transmit channel in the first row and the second column (namely, a transmit channel whose sequence number is 2), a transmit channel in the first row and the third column (namely, a transmit channel whose sequence number is 3), and a transmit channel in the first row and the fourth column (namely, a transmit channel whose sequence number is 4). Transmit channels in the second polarization plane include a transmit channel in the first row and the first column (namely, a transmit channel whose sequence number is 5), a transmit channel in the first row and the second column (namely, a transmit channel whose sequence number is 6), a transmit channel in the first row and the third column (namely, a transmit channel whose sequence number is 7), and a transmit channel in the first row and the fourth column (namely, a transmit channel whose sequence number is 8).

Figure 8:

Case 2: M=4, and N=1. Based on the schematic diagram of an arrangement of the transmit channels shown in FIG. 3, for an example of a structure of the transmit channels of the base station, refer to the schematic diagram of an arrangement of transmit channels shown in FIG. 8. As shown in FIG. 8, transmit channels in the first polarization plane include a transmit channel in the first row and the first column (namely, a transmit channel whose sequence number is 1), a transmit channel in the second row and the first column (namely, a transmit channel whose sequence number is 2), a transmit channel in the third row and the first column (namely, a transmit channel whose sequence number is 3), and a transmit channel in the fourth row and the first column (namely, a transmit channel whose sequence number is 4). Transmit channels in the second polarization plane include a transmit channel in the first row and the first column (namely, a transmit channel whose sequence number is 5), a transmit channel in the second row and the first column (namely, a transmit channel whose sequence number is 6), a transmit channel in the third row and the first column (namely, a transmit channel whose sequence number is 7), and a transmit channel in the fourth row and the first column (namely, a transmit channel whose sequence number is 8).

Figure 9:
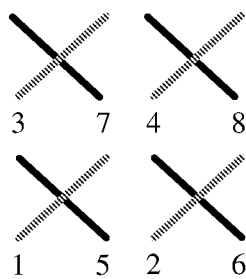

Case 3: M=2, and N=2. Based on the schematic diagram of an arrangement of the transmit channels shown in FIG. 3, for an example of a structure of the transmit channels of the base station, refer to the schematic diagram of an arrangement of transmit channels shown in FIG. 9. As shown in FIG. 9, transmit channels in the first polarization plane include a transmit channel in the first row and the first column (namely, a transmit channel whose sequence number is 1), a transmit channel in the first row and the second column (namely, a transmit channel whose sequence number is 2), a transmit channel in the second row and the first column (namely, a transmit channel whose sequence number is 3), and a transmit channel in the second row and the second column (namely, a transmit channel whose sequence number is 4). Transmit channels in the second polarization plane include a transmit channel in the first row and the first column (namely, a transmit channel whose sequence number is 5), a transmit channel in the first row and the second column (namely, a transmit channel whose sequence number is 6), a transmit channel in the second row and the first column (namely, a transmit channel whose sequence number is 7), and a transmit channel in the second row and the second column (namely, a transmit channel whose sequence number is 8).

The following describes the method shown in FIG. 2 by using the case 1 as an example. In addition, the $k^{th}$ UE is used as an example for description.

First, based on the descriptions of S201 in FIG. 2, the base station may obtain, based on the downlink channel information sent by the $k^{th}$ UE at the moment t, the downlink channel weight matrix corresponding to the $k^{th}$ UE. It should be noted that the downlink channel information of the first cell sent by the $k^{th}$ UE to the base station is separately sent by the $k^{th}$ UE on S subbands. For descriptions of the S subbands, refer to the descriptions of the first step of the 4T base station. Details are not described herein again.

The following uses an example in which the downlink channel information fed back by the $k^{th}$ UE is information fed back at the t moment and on an $s^{th}$ subband to describe the following process. A value range of s is [1, S], and s is a positive integer.

Specifically, the base station may obtain the corresponding downlink channel weight matrix $W_{t,s}^{k}$ based on the downlink channel information sent by the $k^{th}$ UE at the moment t and on the $s^{th}$ subband. An element $W_{t,s}^{k}[i][r]$ in $W_{t,s}^{k}$ is a weight of an $i^{th}$ transmit channel of the 8T base station in the weights of the $r^{th}$ stream at the moment t. i is a sequence number of the transmit channel. For an example of the sequence number, refer to sequence numbers in the schematic diagrams of arrangements of transmit channels shown in FIG. 3 to FIG. 9. For example, $W_{t,s}^{k}[1][r]$ represents a weight that corresponds to a transmit channel (namely, a transmit channel in the first row and the first column in the first polarization plane) whose sequence number is 1 in FIG. 7 and that is in the weight of the $r^{th}$ stream.

Second, based on the descriptions of S202 in FIG. 2, the base station may obtain corresponding rank first initial phase difference matrices based on the downlink channel weight matrix corresponding to the $k^{th}$ UE and the first polarization direction, and obtain corresponding rank second initial phase difference matrices based on the downlink channel weight matrix corresponding to the $k^{th}$ UE and the second polarization direction.

First, the base station may obtain the corresponding first phase matrix $\varphi^+$ and second phase matrix $\varphi^-$ based on the weight value of the $r^{th}$ stream in the downlink channel weight matrix $W_{t,s}^{k}$. The first phase matrix $\varphi^+$ corresponding to the weight of the $r^{th}$ stream in $W_{t,s}^{k}$ may be represented as follows:

$$\varphi^+=[\varphi_{1,1} \varphi_{1,2} \varphi_{1,3} \varphi_{1,4}].$$

$\varphi_{1,1}$ represents a phase of a transmit channel (namely, a transmit channel whose sequence number is 1 in FIG. 7) that is in the first row and the first column in the first polarization plane and that corresponds to the weight of the $r^{th}$ stream in $W_{t,s}^{k}$. $\varphi_{1,2}$ represents a phase of a transmit channel (namely, a transmit channel whose sequence number is 2 in FIG. 7) that is in the first row and the second column in the first polarization plane and that corresponds to the weight of the $r^{th}$ stream in $W_{t,s}^{k}$. $\varphi_{1,3}$ represents a phase of a transmit channel (namely, a transmit channel whose sequence number is 3 in FIG. 7) that is in the first row and the third column in the first polarization plane and that corresponds to the weight of the $r^{th}$ stream in $W_{t,s}^k$. $\varphi_{1,4}$ represents a phase of a transmit channel (namely, a transmit channel whose sequence number is 4 in FIG. 7) that is in the first row and the fourth column in the first polarization plane and that corresponds to the weight of the $r^{th}$ stream in $W_{t,s}^k$.

Similarly, the second phase matrix $\varphi^-$ corresponding to the weight of the $r^{th}$ stream in $W_{t,s}^k$ may be represented as follows:

$$\varphi^- = [\varphi_{1,1}' \varphi_{1,2}' \varphi_{1,3}' \varphi_{1,4}'].$$

$\varphi_{1,1}'$ represents a phase of a transmit channel (namely, a transmit channel whose sequence number is 5 in FIG. 7) that is in the first row and the first column in the second polarization plane and that corresponds to the weight of the $r^{th}$ stream in $W_{t,s}^k$. $\varphi_{1,2}'$ represents a phase of a transmit channel (namely, a transmit channel whose sequence number is 6 in FIG. 7) that is in the first row and the second column in the second polarization plane and that corresponds to the weight of the $r^{th}$ stream in $W_{t,s}^k$. $\varphi_{1,3}'$ represents a phase of a transmit channel (namely, a transmit channel whose sequence number is 7 in FIG. 7) that is in the first row and the third column in the second polarization plane and that corresponds to the weight of the $r^{th}$ stream in $W_{t,s}^k$. $\varphi_{1,4}'$ represents a phase of a transmit channel (namely, a transmit channel whose sequence number is 8 in FIG. 7) that is in the first row and the fourth column in the second polarization plane and that corresponds to the weight of the $r^{th}$ stream in $W_{t,s}^k$.

Then, the base station obtains, based on the first phase matrix $\varphi^+$ corresponding to the weight of the $r^{th}$ stream in $W_{t,s}^k$, the corresponding first initial phase difference matrix $\theta^+$, and obtains, based on the second phase matrix $\varphi^-$ corresponding to the weight of the $r^{th}$ stream in $W_{t,s}^k$, the corresponding second initial phase difference matrix $\theta^-$. The first initial phase difference matrix $\theta^+$ and the second initial phase difference matrix $\theta^-$ corresponding to the weight of the $r^{th}$ stream in $W_{t,s}^k$ may be respectively represented as follows:

$$\theta^+ = (-1) \times [\theta_{1,1} \theta_{1,2} \theta_{1,3} \theta_{1,4}]; \text{ and}$$

$$\theta^- = (-1) \times [\theta_{1,1}' \theta_{1,2}' \theta_{1,3}' \theta_{1,4}'].$$

$\theta_{1,1}$ represents a phase compensation value of a transmit channel (namely, a transmit channel whose sequence number is 1 in FIG. 7) that is in the first row and the first column in the first polarization plane and that corresponds to the weight of the $r^{th}$ stream in $W_{t,s}^k$. $\theta_{1,2}$ represents a phase compensation value of a transmit channel (namely, a transmit channel whose sequence number is 2 in FIG. 7) that is in the first row and the second column in the first polarization plane and that corresponds to the weight of the $r^{th}$ stream in $W_{t,s}^k$. $\theta_{1,3}$ represents a phase compensation value of a transmit channel (namely, a transmit channel whose sequence number is 3 in FIG. 7) that is in the first row and the third column in the first polarization plane and that corresponds to the weight of the $r^{th}$ stream in $W_{t,s}^k$. $\theta_{1,4}$ represents a phase compensation value of a transmit channel (namely, a transmit channel whose sequence number is 4 in FIG. 7) that is in the first row and the fourth column in the first polarization plane and that corresponds to the weight of the $r^{th}$ stream in $W_{t,s}^k$.

Similarly, $\theta_{1,1}'$ represents a phase compensation value of a transmit channel (namely, a transmit channel whose sequence number is 5 in FIG. 7) that is in the first row and the first column in the second polarization plane and that corresponds to the weight of the $r^{th}$ stream in $W_{t,s}^k$. $\theta_{1,2}'$ represents a phase compensation value of a transmit channel (namely, a transmit channel whose sequence number is 6 in FIG. 7) that is in the first row and the second column in the second polarization plane and that corresponds to the weight of the $r^{th}$ stream in $W_{t,s}^k$. $\theta_{1,3}'$ represents a phase compensation value of a transmit channel (namely, a transmit channel whose sequence number is 7 in FIG. 7) that is in the first row and the third column in the second polarization plane and that corresponds to the weight of the $r^{th}$ stream in $W_{t,s}^k$. $\theta_{1,4}'$ represents a phase compensation value of a transmit channel (namely, a transmit channel whose sequence number is 8 in FIG. 7) that is in the first row and the fourth column in the second polarization plane and that corresponds to the weight of the $r^{th}$ stream in $W_{t,s}^k$.

The first initial phase difference matrix $\theta^+$ and the second initial phase difference matrix $\theta^-$ corresponding to the weight of the $r^{th}$ stream may be combined into a user initial phase difference matrix corresponding to the weight of the $r^{th}$ stream in $W_{t,s}^k$. In this case, the user initial phase difference matrix corresponding to the weight of the $r^{th}$ stream in $W_{t,s}^k$ may be represented as follows:

$$[\theta^+, \theta^-] = (-1) \times [\theta_{1,1} \theta_{1,2} \theta_{1,3} \theta_{1,4} \theta_{1,1}' \theta_{1,2}' \theta_{1,3}' \theta_{1,4}'].$$

Next, calculation is performed by using transmit channels (namely, a transmit channel whose sequence number is 1 and a transmit channel whose sequence number is 5 in FIG. 7) in the first row and the first column in the first phase plane and the second phase plane as references, that is, x=1 and y=1.

Based on the descriptions of the second step of the foregoing 4T base station, it may be obtained that: $\theta_{1,1} = \theta_{1,2} = \theta_{1,1}' = 0$. Therefore, only five remaining phase compensation values $\theta_{1,3}$, $\theta_{1,4}$, $\theta_{1,2}'$, $\theta_{1,3}'$, and $\theta_{1,4}'$ need to be calculated. A calculation process of $\theta_{1,3}$ is specifically as follows:

$$\theta_{1,3} = (3-1) \times \Delta_H + (1-1) \times \Delta_V + \varphi_{1,1} - \varphi_{1,2} = 2 \times (\varphi_{1,2} - \varphi_{1,1}) + \varphi_{1,1} - \varphi_{1,2}.$$

A calculation process of $\theta_{1,4}$ is specifically as follows:

$$\theta_{1,4} = (4-1) \times \Delta_H + (1-1) \times \Delta_V + \varphi_{1,1} - \varphi_{1,4} = 3 \times (\varphi_{1,2} - \varphi_{1,1}) + \varphi_{1,1} - \varphi_{1,4}.$$

A calculation process of $\theta_{1,2}'$ is specifically as follows:

$$\theta_{1,2}' = (2-1) \times \Delta_H + (1-1) \times \Delta_V + \varphi_{1,1}' - \varphi_{1,2}' = \varphi_{1,2} - \varphi_{1,2} - \varphi_{1,1} + \varphi_{1,1}' - \varphi_{1,2}'.$$

A calculation process of $\theta_{1,3}'$ is specifically as follows:

$$\theta_{1,3}' = (3-1) \times \Delta_H + (1-1) \times \Delta_v + \varphi_{1,1}' - \varphi_{1,3}' = 2 \times (\varphi_{1,2} - \varphi_{1,1}) + \varphi_{1,1}' - \varphi_{1,3}'.$$

A calculation process of $\theta_{1,4}'$ is specifically as follows:

$$\theta_{1,4}' = (4-1) \times \Delta_H + (1-1) \times \Delta_V + \varphi_{1,1}' - \varphi_{1,4}' = 3 \times (\varphi_{1,2} - \varphi_{1,1}) + \varphi_{1,1}' - \varphi_{1,4}'.$$

In this embodiment of this application, for the downlink channel information fed back by the $k^{th}$ UE at the moment t, a manner in which the base station obtains a user initial phase difference matrix corresponding to the weights of the remaining rank-1 streams corresponding to the $s^{th}$ subband is similar to the foregoing manner in which the base station obtains the user initial phase difference matrix corresponding to the weights of the $r^{th}$ stream corresponding to the $s^{th}$ subband. Details are not described herein again. A manner in which the base station obtains initial phase difference matrices of rank users respectively corresponding to the remaining S−1 subbands is similar to the foregoing manner of obtaining initial phase difference matrices of rank users respectively corresponding to the $s^{th}$ subband, and details are not described herein again.

Specifically, based on the foregoing expression of $\theta_{1,3}$, S×rank phase compensation values $\theta_{1,3}$ corresponding to the $k^{th}$ UE at the moment t and on the S subbands are summed up, and the complex value $\Delta_{t,1}{}^k = e^{j\theta_{1,3}}$ that is of $\theta_{1,3}$ corresponding to the $k^{th}$ UE at the moment t and that is obtained through estimation is as follows:

$$\Delta_{t,1}{}^k = \Sigma_{s=1}^{s=S} \Sigma_{r=1}^{r=rank} [W_{t,s}{}^k[2][r] \cdot *W_{t,s}{}^k[1][r])*]^2 \cdot W_{t,s}{}^k[1][r] \cdot (W_{t,s}{}^k[3][r])*.$$

$W_{t,s}{}^k[2][r]$ is a phase $\varphi_{1,2}$ of a transmit channel (namely, a transmit channel in the first row and the second column in the first polarization plane) whose sequence number is 2 in FIG. 7 and that corresponds to the weight of the $r^{th}$ stream in $W_{t,s}{}^k$. $W_{t,s}{}^k[1][r]$ is a phase $\varphi_{1,1}$ of a transmit channel (namely, a transmit channel in the first row and the first column in the first polarization plane) whose sequence number is 1 in FIG. 7 and that corresponds to the weight of the $r^{th}$ stream in $W_{t,s}{}^k$. $(W_{t,s}{}^k[1][r])*$ corresponds to $-\varphi_{1,1}$ in the foregoing expression of $\theta_{1,3}$, and $[W_{t,s}{}^k[2][r] \cdot (W_{t,s}{}^k[1][r])*]^2$ corresponds to $2 \times (\varphi_{1,2} - \varphi_{1,1})$ in the foregoing expression of $\theta_{1,3}$. $W_{t,s}{}^k[3][r]$ is a phase $\varphi_{1,3}$ of a transmit channel (namely, a transmit channel in the first row and the third column in the first polarization plane) whose sequence number is 3 in FIG. 7 and that corresponds to the weight of the $r^{th}$ stream in $W_{t,s}{}^k$. $(W_{t,s}{}^k[3][r])*$ corresponds to $-\varphi_{1,3}$ in the foregoing expression of $\theta_{1,3}$.

Similarly, based on the foregoing expression of $\theta_{1,4}$, S×rank phase compensation values $\theta_{1,4}$ corresponding to the $k^{th}$ UE at the moment t and on the S subbands are summed up, and the complex value $\Delta_{t,2}{}^k = e^{j\theta_{1,4}}$ that is of $\theta_{1,4}$ corresponding to the $k^{th}$ UE at the moment t and that is obtained through estimation is as follows:

$$\Delta_{t,2}{}^k = \Sigma_{s=1}^{s=S} \Sigma_{r=1}^{r=rank} [W_{t,s}{}^k[2][r] \cdot (W_{t,s}{}^k[1][r])*]^3 \cdot W_{t,s}{}^k[1][r] \cdot (W_{t,s}{}^k[4][r])*.$$

$[W_{t,s}{}^k[2][r] \cdot (W_{t,s}{}^k[1][r])*]^3$ corresponds to $3 \times (\varphi_{1,2} - \varphi_{1,1})$ in the foregoing expression of $\theta_{1,4}$. $W_{t,s}{}^k[4][r]$ is a phase $\varphi_{1,4}$ of a transmit channel (namely, a transmit channel in the first row and the fourth column in the first polarization plane) whose sequence number is 4 in FIG. 7 and that corresponds to the weight of the $r^{th}$ stream in $W_{t,s}{}^k$. $(W_{t,s}{}^k[4][r])*$ corresponds to $-\varphi_{1,4}$ in the foregoing expression of $\theta_{1,4}$.

Similarly, based on the foregoing expression of $\theta_{1,2}'$, S×rank phase compensation values $\theta_{1,2}'$ corresponding to the $k^{th}$ UE at the moment t and on the S subbands are summed up, and the complex value $\Delta_{t,3}{}^k = e^{j\theta'_{1,2}}$ that is of $\theta_{1,2}'$ corresponding to the $k^{th}$ UE at the moment t and that is obtained through estimation is as follows:

$$\Delta_{t,3}{}^k = \Sigma_{s=1}^{s=S} \Sigma_{r=1}^{r=rank} W_{t,s}{}^k[2][r] \cdot (W_{t,s}{}^k[1][r])^* \cdot W_{t,s}{}^k[5][r] \cdot (W_{t,s}{}^k[6][r])^*.$$

$W_{t,s}{}^k[5][r]$ is a phase $\varphi_{1,1}'$ of a transmit channel (namely, a transmit channel in the first row and the first column in the second polarization plane) whose sequence number is 5 in FIG. 7 and that corresponds to the weight of the $r^{th}$ stream in $W_{t,s}{}^k$. $W_{t,s}{}^k[6][r]$ is a phase $\varphi_{1,2}'$ of a transmit channel (namely, a transmit channel in the first row and the second column in the second polarization plane) whose sequence number is 6 in FIG. 7 and that corresponds to the weight of the $r^{th}$ stream in $W_{t,s}{}^k$. $(W_{t,s}{}^k[6][r])*$ corresponds to $-\varphi_{1,2}'$ in the foregoing expression of $\theta_{1,2}'$.

Similarly, based on the foregoing expression of $\theta_{1,3}'$, S×rank phase compensation values $\theta_{1,3}'$ corresponding to the $k^{th}$ UE at the moment t and on the S subbands are summed up, and the complex value $\Delta_{t,4}{}^k = e^{j\theta'_{1,3}}$ that is of $\theta_{1,3}'$ corresponding to the $k^{th}$ UE at the moment t and that is obtained through estimation is as follows:

$$\Delta_{t,4}{}^k = \Sigma_{s=1}^{s=S} \Sigma_{r=1}^{r=rank} [W_{t,s}{}^k[2][r] \cdot (W_{t,s}{}^k[1][r])*]^2 \cdot W_{t,s}{}^k[5][r] \cdot (W_{t,s}{}^k[7][r])*.$$

$W_{t,s}{}^k[7][r]$ is a phase $\varphi_{1,3}'$ of a transmit channel (namely, a transmit channel in the first row and the third column in the second polarization plane) whose sequence number is 7 in FIG. 7 and that corresponds to the weight of the $r^{th}$ stream in $W_{t,s}{}^k$. $(W_{t,s}{}^k[7][r])*$ corresponds to $-\varphi_{1,3}'$ in the foregoing expression of $\theta_{1,3}'$.

Similarly, based on the foregoing expression of $\theta_{1,4}'$, S×rank phase compensation values $\theta_{1,4}'$ corresponding to the $k^{th}$ UE at the moment t and on the S subbands are summed up, and the complex value $\Delta_{t,5}{}^k = e^{j\theta'_{1,4}}$ that is of $\theta_{1,4}'$ corresponding to the $k^{th}$ UE at the moment t and that is obtained through estimation is as follows:

$$\Delta_{t,5}{}^k = \Sigma_{s=1}^{s=S} \Sigma_{r=1}^{r=rank} [W_{t,s}{}^k[2][r] \cdot (W_{t,s}{}^k[1][r])*]^3 \cdot W_{t,s}{}^k[5][r] \cdot (W_{t,s}{}^k[8][r])*.$$

$W_{t,s}{}^k[8][r]$ is a phase $\varphi_{1,4}'$ of a transmit channel (namely, a transmit channel in the first row and the fourth column in the second polarization plane) whose sequence number is 8 in FIG. 7 and that corresponds to the weight of the $r^{th}$ stream in $W_{t,s}{}^k$. $(W_{t,s}{}^k[8][r])*$ corresponds to $-\varphi_{1,4}'$ in the foregoing expression of $\theta_{1,4}'$.

Finally, normalization processing is separately performed on $\Delta_{t,i}{}^k$ obtained through estimation, and only phase information is reserved, so that a user-level phase compensation value $\Delta_{t,i}{}^k$ of a transmit channel corresponding to the downlink channel weight matrix $W_t{}^k$ corresponding to the $k^{th}$ UE can be obtained. $\Delta_{t,i}{}^k$ corresponds to the moment t. A calculation formula of $\Delta_{t,i}{}^k$ is specifically as follows:

$$\Delta_{t,i}^k = \frac{\Delta_{t,i}^k}{|\Delta_{t,i}^k|}.$$

i is a positive integer, and a value range of i is [1, 5].

In this embodiment of this application, a manner in which the base station obtains user-level phase compensation values of transmit channels corresponding to the downlink channel weight matrices corresponding to the remaining K−1 UEs is similar to the foregoing manner of obtaining $\Delta_{t,i}{}^k$. Details are not described herein again.

Third, based on the descriptions of S203 in FIG. 2, the base station may obtain the cell initial phase difference matrix based on the K×rank first initial phase difference matrices and the K×rank second initial phase difference matrices.

Specifically, the base station may perform filtering for preset duration on the user-level phase compensation values (namely, $\Delta_{t,i}{}^k$) that are of K×5 transmit channels and that are obtained in the foregoing second step, to obtain five cell-level phase compensation values corresponding to the cell initial phase difference matrix. Based on the descriptions of S203 in FIG. 2, filtering duration for which the base station performs filtering on the user-level phase compensation value (for example, $\Delta_{t,i}{}^k$, where i is 1 or 2) of the transmit channel in the first polarization plane may be first preset duration $T_1$. Filtering duration for which the base station performs filtering on the user-level phase compensation value (for example, $\Delta_{t,i}{}^k$, where i is 3, 4, or 5) of the transmit channel in the second polarization plane may be second preset duration $T_2$. The first preset duration $T_1$ and the second preset duration $T_2$ may be equal or not equal.

For example, the base station processes, by using a direct average filtering method or an alpha mean filtering method, the K×5 user-level phase compensation values obtained in the foregoing second step, and then performs normalization processing, and retains only the phase information.

Specifically, a calculation formula for performing processing by using the direct average filtering method is as follows:

$$\Delta_{t,i} = \sum_{k=1}^{k=K} \Delta_{t,i}^k, i = 1, \ldots, 5;$$

$$\Delta_i = \frac{1}{T_1} \sum_{l=0}^{l=T_1-1} \Delta_{t-l,i}, i = 1, 2;$$

$$\Delta_i = \frac{1}{T_2} \sum_{l=0}^{l=T_2-1} \Delta_{t-l,i}, i = 3, 4, 5; \text{ and}$$

$$\Delta_i = \frac{\Delta_i}{|\Delta_i|}, i = 1, \ldots, 5.$$

Specifically, a calculation formula for performing processing by using the alpha mean filtering method is as follows:

$$\Delta_{t,i} = \sum_{k=1}^{k=K} \Delta_{t,i}^k, i = 1, \ldots, 5;$$

$$\Delta_i = \alpha \times \frac{\Delta_{t,i}}{\Delta_{t,i}} + (1-\alpha) \times \Delta_i, i = 1, \ldots, 5; \text{ and}$$

$$\Delta_i = \frac{\Delta_i}{|\Delta_i|}, i = 1, \ldots, 5.$$

A value of α may be small, for example, may be, but is not limited to, 0.01 or 0.001. This is not limited in this embodiment of this application.

It is obtained in the foregoing calculation manner that: $\Delta_1$ is the phase compensation value $\rho_{1,3}$ corresponding to the transmit channel (namely, the transmit channel in the first row and the third column in the first polarization plane) whose sequence number is 3 in FIG. 7 in the cell initial phase difference matrix. $\Delta_2$ is the phase compensation value $\rho_{1,4}$ corresponding to the transmit channel (namely, the transmit channel in the first row and the fourth column in the first polarization plane) whose sequence number is 4 in FIG. 7 in the cell initial phase difference matrix. $\Delta_3$ is the phase compensation value $\rho_{1,2}'$ corresponding to the transmit channel (namely, the transmit channel in the first row and the second column in the second polarization plane) whose sequence number is 6 in FIG. 7 in the cell initial phase difference matrix. $\Delta_4$ is the phase compensation value $\rho_{1,3}'$ corresponding to the transmit channel (namely, the transmit channel in the first row and the third column in the second polarization plane) whose sequence number is 7 in FIG. 7 in the cell initial phase difference matrix. $\Delta_5$ is the phase compensation value $\rho_{1,4}'$ corresponding to the transmit channel (namely, the transmit channel in the first row and the fourth column in the second polarization plane) whose sequence number is 8 in FIG. 7 in the cell initial phase difference matrix. Therefore, the cell initial phase difference matrix P may be represented as follows:

$$P=[1\ 1\Delta_1{}^*\Delta_2{}^*1\Delta_3{}^*\ \Delta_4{}^*\Delta_5{}^*]^T.$$

In the matrix P, an element (where a value of the element is 1) in the first row and the first column is used to compensate for an initial phase of the transmit channel (namely, the transmit channel in the first row and the first column in the first polarization plane) whose sequence number is 1 in FIG. 7. An element (where a value of the element is 1) in the second row and the first column is used to compensate for an initial phase of the transmit channel (namely, the transmit channel in the first row and the second column in the first polarization plane) whose sequence number is 2 in FIG. 7. An element (where a value of the element is $\Delta_1{}^*$) in the third row and the first column is used to compensate for an initial phase of the transmit channel (namely, the transmit channel in the first row and the third column in the first polarization plane) whose sequence number is 3 in FIG. 7. An element (where a value of the element is $\Delta_2{}^*$) in the fourth row and the first column is used to compensate for an initial phase of the transmit channel (namely, the transmit channel in the first row and the fourth column in the first polarization plane) whose sequence number is 4 in FIG. 7.

Similarly, in the matrix P, an element (where a value of the element is 1) in the fifth row and the first column is used to compensate for an initial phase of the transmit channel (namely, the transmit channel in the first row and the first column in the second polarization plane) whose sequence number is 5 in FIG. 7. An element (where a value of the element is $\Delta_3{}^*$) in the sixth row and the first column is used to compensate for an initial phase of the transmit channel (namely, the transmit channel in the first row and the second column in the second polarization plane) whose sequence number is 6 in FIG. 7. An element (where a value of the element is $\Delta_4{}^*$) in the seventh row and the first column is used to compensate for an initial phase of the transmit channel (namely, the transmit channel in the first row and the third column in the second polarization plane) whose sequence number is 7 in FIG. 7. An element (where a value of the element is $\Delta_5{}^*$) in the eighth row and the first column is used to compensate for an initial phase of the transmit channel (namely, the transmit channel in the first row and the fourth column in the second polarization plane) whose sequence number is 8 in FIG. 7.

Finally, based on the descriptions of S204 in FIG. 2, the base station may implement initial phase correction of the transmit channels of the 8T base station based on the cell initial phase difference matrix P obtained in the third step.

Processing procedures of the foregoing case 2 and case 3 are the same as the processing procedure of the foregoing case 1, and details are not described herein again. It should be noted that positions of the transmit channels are variable. For example, positions of a transmit channel whose sequence number is originally 1 and a transmit channel whose sequence number is originally 4 may be interchanged. In this case, an element (where a value of the element is $\Delta_2{}^*$) in the fourth row and the first column of the cell initial phase difference matrix P may be used to compensate for an initial phase of the transmit channel (that is, the transmit channel whose sequence number is originally 1) whose sequence number is 4 after the positions are interchanged.

It is not limited to the examples listed above that when the first initial phase difference matrix and the second initial phase difference matrix are calculated, transmit channels in any row and any column in the first phase plane and the second phase plane may alternatively be used as references for calculation. For example, transmit channels in the first row and the second column in the first phase plane and the second phase plane is used as references for calculation. It is assumed that the base station is an 8T base station, M=1, and N=4. In this case, for a specific example of a structure of the transmit channels of the base station, refer to a schematic diagram of an arrangement of transmit channels in FIG. 7. In this case, in the transmit channel initial phase correction method shown in FIG. 2, a specific calculation process of determining the first initial phase difference matrix and the second initial phase difference matrix in S202 is different. For the difference, refer to the following example descriptions. Other descriptions are similar to the foregoing descriptions of the 8T base station.

It is similar to the descriptions of the 8T base station that, the $k^{th}$ UE is used as an example for description. The base station obtains the corresponding first phase matrix $\varphi^+$ and second phase matrix $\varphi^-$ based on the weight value of the $r^{th}$ stream in the downlink channel weight matrix $W_{t,s}^k$. Expressions are specifically as follows:

$$\varphi^+=[\varphi_{1,1}\varphi_{1,2}\varphi_{1,3}\varphi_{1,4}]; \text{ and}$$

$$\varphi^-=[\varphi_{1,1}'\varphi_{1,2}'\varphi_{1,3}'\varphi_{1,4}'].$$

Then, the base station obtains the first initial phase difference matrix $\theta^+$ based on the first phase matrix $\varphi^+$, and obtains the second initial phase difference matrix $\theta^-$ based on the second phase matrix $\varphi^-$. Expressions are specifically as follows:

$$\theta^+=(-1)\times[\theta_{1,1}\theta_{1,2}\theta_{1,3}\theta_{1,4}]; \text{ and}$$

$$\theta^-=(-1)\times[\theta_{1,1}'\theta_{1,2}'\theta_{1,3}'\theta_{1,4}'].$$

Next, calculation is performed by using transmit channels (namely, a transmit channel whose sequence number is 2 and a transmit channel whose sequence number is 6 in FIG. 7) in the first row and the second column in the first phase plane and the second phase plane as references, that is, x=1 and y=2. $\Delta_H$ and $\Delta_V$ are first calculated, and are specifically as follows:

$$\Delta_H=\varphi_{1,3}-\varphi_{1,2}; \text{ and}$$

$$\Delta_V=\varphi_{2,2}-\varphi_{1,2}.$$

A calculation process of $\theta_{1,1}$ is specifically as follows:

$$\theta_{1,1}=(1-2)\times\Delta_H+(1-1)\times\Delta_V+\varphi_{1,2}-\varphi_{1,1}=\varphi_{1,2}-\varphi_{1,3}+\varphi_{1,2}-\varphi_{1,1}.$$

A calculation process of $\theta_{1,2}$ is specifically as follows:

$$\theta_{1,2}=(2-2)\times\Delta_H+(1-1)\times\Delta_V+\varphi_{1,2}-\varphi_{1,2}=0.$$

A calculation process of $\theta_{1,3}$ is specifically as follows:

$$\theta_{1,3}=(3-2)\times\Delta_H+(1-1)\times\Delta_V+\varphi_{1,2}-\varphi_{1,3}=0.$$

A calculation process of $\theta_{1,4}$ is specifically as follows:

$$\theta_{1,4}=(4-2)\times\Delta_H+(1-1)\times\Delta_V+\varphi_{1,2}-\varphi_{1,4}=2\times(\varphi_{1,3}-\varphi_{1,2})+\varphi_{1,2}-\varphi_{1,4}.$$

A calculation process of $\theta_{1,1}'$ is specifically as follows:

$$\theta_{1,1}'=(1-2)\times\Delta_H+(1-1)\times\Delta_V+\varphi_{1,2}'-\varphi_{1,1}'=\varphi_{1,2}-\varphi_{1,3}+\varphi_{1,2}'-\varphi_{1,1}'.$$

A calculation process of $\theta_{1,2}'$ is specifically as follows:

$$\theta_{1,2}'=(2-2)\times\Delta_H+(1-1)\times\Delta_V+\varphi_{1,2}'-\varphi_{1,2}'=0.$$

A calculation process of $\theta_{1,3}'$ is specifically as follows:

$$\theta_{1,3}'=(3-2)\times\Delta_H+(1-1)\times\Delta_V+\varphi_{1,2}'-\varphi_{1,3}'=\varphi_{1,3}-\varphi_{1,2}+\varphi_{1,2}'-\varphi_{1,3}'.$$

A calculation process of $\theta_{1,4}'$ is specifically as follows:

$$\theta_{1,4}'=(4-2)\times\Delta_H+(1-1)\times\Delta_V+\varphi_{1,2}'-\varphi_{1,4}'=2\times(\varphi_{1,3}-\varphi_{1,2})+\varphi_{1,2}'-\varphi_{1,4}'.$$

In this embodiment of this application, for the downlink channel information fed back by the $k^{th}$ UE at the moment t, a manner in which the base station obtains a user initial phase difference matrix corresponding to the weights of the remaining rank-1 streams corresponding to the $s^{th}$ subband is similar to the foregoing manner in which the base station obtains the user initial phase difference matrix corresponding to the weights of the $r^{th}$ stream corresponding to the $s^{th}$ subband. Details are not described herein again. A manner in which the base station obtains initial phase difference matrices of rank users respectively corresponding to the remaining S-1 subbands is similar to the foregoing manner of obtaining initial phase difference matrices of rank users respectively corresponding to the $s^{th}$ subband, and details are not described herein again.

Specifically, based on the foregoing expression of $\theta_{1,1}$, S×rank phase compensation values $\theta_{1,1}$ corresponding to the $k^{th}$ UE at the moment t and on the S subbands are summed up, and the complex value $\Delta_{t,1}^k=e^{j\Theta_{1,1}}$ that is of $\theta_{1,1}$ corresponding to the $k^{th}$ UE at the moment t and that is obtained through estimation is as follows:

$$\Delta_{t,1}^k=\Sigma_{s=1}^{s=S}\Sigma_{r=1}^{r=rank}W_{t,s}^k[2][r]\cdot(W_{t,s}^k[3][r])^*\cdot W_{t,s}^k[2][r]\cdot(W_{t,s}^k[1][r])^*.$$

$W_{t,s}^k[2][r]$ is a phase $\varphi_{1,2}$ of a transmit channel (namely, a transmit channel in the first row and the second column in the first polarization plane) whose sequence number is 2 in FIG. 7 and that corresponds to the weight of the $r^{th}$ stream in $W_{t,s}^k$. $W_{t,s}^k[3][r]$ is a phase $\varphi_{1,3}$ of a transmit channel (namely, a transmit channel in the first row and the third column in the first polarization plane) whose sequence number is 3 in FIG. 7 and that corresponds to the weight of the $r^{th}$ stream in $W_{t,s}^k$. $(W_{t,s}^k[3][r])^*$ corresponds to $-\varphi_{1,3}$ in the foregoing expression of $\theta_{1,1}$, and $W_{t,s}^k[1][r]$ is a phase $\varphi_{1,1}$ of a transmit channel (namely, a transmit channel in the first row and the first column in the first polarization plane) whose sequence number is 1 in FIG. 7 and that corresponds to the weight of the $r^{th}$ stream in $W_{t,s}^k$. $(W_{t,s}^k[1][r])^*$ corresponds to $-\varphi_{1,1}$ in the foregoing expression of $\theta_{1,1}$.

Similarly, based on the foregoing expression of $\theta_{1,4}$, S×rank phase compensation values $\theta_{1,4}$ corresponding to the $k^{th}$ UE at the moment t and on the S subbands are summed up, and the complex value $\Delta_{t,2}^k=e^{j\Theta_{1,4}}$ that is of $\theta_{1,4}$ corresponding to the $k^{th}$ UE at the moment t and that is obtained through estimation is as follows:

$$\Delta_{t,2}^k=\Sigma_{s=1}^{s=S}\Sigma_{r=1}^{r=rank}[W_{t,s}^k[3][r]\cdot(W_{t,s}^k[2][r])^*]^2\cdot W_{t,s}^k[2][r]\cdot(W_{t,s}^k[4][r])^*.$$

$(W_{t,s}^k[2][r])^*$ corresponds to $-\varphi_{1,2}$ in the foregoing expression of $\theta_{1,4}$, and $[W_{t,s}^k[3][r]\cdot(W_{t,s}^k[2][r])^*]^2$ corresponds to $2\times(\varphi_{1,3}-\varphi_{1,2})$ in the foregoing expression of $\theta_{1,4}$. $W_{t,s}^k[4][r]$ is a phase $\varphi_{1,4}$ of a transmit channel (namely, a transmit channel in the first row and the fourth column in the first polarization plane) whose sequence number is 4 in FIG. 7 and that corresponds to the weight of the $r^{th}$ stream in $W_{t,s}^k$. $(W_{t,s}^k[4][r])^*$ corresponds to $-\varphi_{1,4}$ in the foregoing expression of $\theta_{1,4}$.

Similarly, based on the foregoing expression of $\theta_{1,1}'$, S×rank phase compensation values $\theta_{1,1}'$ corresponding to the $k^{th}$ UE at the moment t and on the S subbands are summed up, and the complex value $\Delta_{t,3}^k=e^{j\Theta_{1,1}}$ that is of $\theta_{1,1}'$ corresponding to the $k^{th}$ UE at the moment t and that is obtained through estimation is as follows:

$$\Delta_{t,3}^k=\Sigma_{s=1}^{s=S}\Sigma_{r=1}^{r=rank}W_{t,s}^k[2][r]\cdot(W_{t,s}^k[3][r])^*\cdot W_{t,s}^k[6][r]\cdot(W_{t,s}^k[5][r])^*.$$

$W_{t,s}^k[6][r]$ is a phase $\varphi_{1,2}'$ of a transmit channel (namely, a transmit channel in the first row and the second column in the second polarization plane) whose sequence number is 6 in FIG. 7 and that corresponds to the weight of the $r^{th}$ stream in $W_{t,s}^k$. $W_{t,s}^k[5][r]$ is a phase $\varphi_{1,1}'$ of a transmit channel (namely, a transmit channel in the first row and the first column in the second polarization plane) whose sequence number is 5 in FIG. 7 and that corresponds to the weight of the $r^{th}$ stream in $W_{t,s}{}^k$. $(W_{t,s}{}^k[5][r])^*$ corresponds to $-\varphi_{1,1}'$ in the foregoing expression of $\theta_{1,1}'$.

Similarly, based on the foregoing expression of $\theta_{1,3}'$, S×rank phase compensation values $\theta_{1,3}'$ corresponding to the $k^{th}$ UE at the moment t and on the S subbands are summed up, and the complex value $\Delta_{t,4}{}^k = e^{j\theta_{1,3}'}$ that is of $\theta_{1,3}'$ corresponding to the $k^{th}$ UE at the moment t and that is obtained through estimation is as follows:

$$\Delta_{t,4}{}^k = \Sigma_{s=1}{}^{s=S}\Sigma_{r=1}{}^{r=rank}W_{t,s}{}^k[3][r]\cdot(W_{t,s}{}^k[2][r])^*\cdot W_{t,s}{}^k[6][r]\cdot(W_{t,s}{}^k[7][r])^*.$$

$W_{t,s}{}^k[7][r]$ is a phase $\varphi_{1,3}'$ of a transmit channel (namely, a transmit channel in the first row and the third column in the second polarization plane) whose sequence number is 7 in FIG. 7 and that corresponds to the weight of the $r^{th}$ stream in $W_{t,s}{}^k$. $(W_{t,s}{}^k[7][r])^*$ corresponds to $-\varphi_{1,3}'$ in the foregoing expression of $\theta_{1,3}'$.

Similarly, based on the foregoing expression of $\theta_{1,4}'$, S×rank phase compensation values $\theta_{1,4}'$ corresponding to the $k^{th}$ UE at the moment t and on the S subbands are summed up, and the complex value $\Delta_{t,5}{}^k = e^{j\theta_{1,4}'}$ that is of $\theta_{1,4}'$ corresponding to the $k^{th}$ UE at the moment t and that is obtained through estimation is as follows:

$$\Delta_{t,5}{}^k = \Sigma_{s=1}{}^{s=S}\Sigma_{r=1}{}^{r=rank}[W_{t,s}{}^k[3][r]\cdot(W_{t,s}{}^k[2][r])^*]^2\cdot W_{t,s}{}^k[6][r]\cdot(W_{t,s}{}^k[8][r])^*.$$

$W_{t,s}{}^k[8][r]$ is a phase $\varphi_{1,4}'$ of a transmit channel (namely, a transmit channel in the first row and the fourth column in the second polarization plane) whose sequence number is 8 in FIG. 7 and that corresponds to the weight of the $r^{th}$ stream in $W_{t,s}{}^k$. $(W_{t,s}{}^k[8][r])^*$ corresponds to $-\varphi_{1,4}'$ in the foregoing expression of $\theta_{1,4}'$.

A subsequent process, for example, normalization processing performed on $\Delta_{t,i}{}^k$ obtained through estimation, is similar to the descriptions of the 8T base station, and is not described herein again.

The method in embodiments of this application is described above in detail, and an apparatus in embodiments of this application is provided below.

Figure 10:
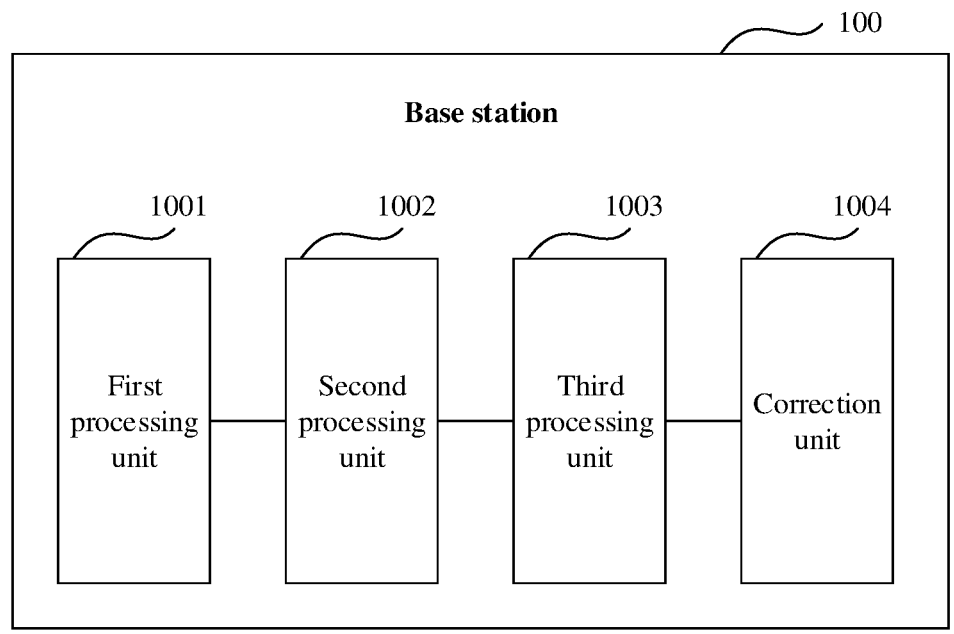
FIG. 10 is a schematic diagram of a structure of a base station according to an embodiment of this application.

FIG. 10 is a schematic diagram of a structure of a base station 100 according to an embodiment of this application. The base station 100 may include a first processing unit 1001, a second processing unit 1002, a third processing unit 1003, and a correction unit 1004. Detailed descriptions of the units are as follows.

The first processing unit 1001 is configured to obtain K downlink channel weight matrices based on K pieces of downlink channel information sent by K UEs. K is a positive integer, the downlink channel information is fed back by the UE in response to a preset reference signal sent by the base station 100, the downlink channel weight matrix is an $N_T$×rank-dimensional matrix, $N_T$ is a quantity of transmit channels of the base station 100, and rank is a quantity of signal streams received by the UE.

The second processing unit 1002 is configured to: obtain K×rank first initial phase difference matrices based on the K downlink channel weight matrices and a first polarization direction of the transmit channels of the base station 100, and obtain K×rank second initial phase difference matrices based on the K downlink channel weight matrices and a second polarization direction of the transmit channels of the base station 100. The first polarization direction and the second polarization direction are different, the first initial phase difference matrix and the second initial phase difference matrix are both M×N-dimensional matrices, $N_T = 2 \times M \times N$, and both M and N are positive integers.

The third processing unit 1003 is configured to obtain a cell initial phase difference matrix based on the K×rank first initial phase difference matrices and the K×rank second initial phase difference matrices.

The correction unit 1004 is configured to implement initial phase correction of the transmit channels of the base station 100 based on the cell initial phase difference matrix.

In an optional implementation, the downlink channel information includes at least one PMI fed back by the UE and/or an SRS fed back by the UE.

In an optional implementation, the downlink channel information is an SRS fed back by the UE. The first processing unit 1001 includes:
 a fourth processing unit, configured to obtain K downlink channel matrices based on the K pieces of downlink channel information, where the downlink channel matrix is an $N_R \times N_T$-dimensional matrix, and $N_R$ is a quantity of receive channels of the UE; and
 a fifth processing unit, configured to perform singular value decomposition on the K downlink channel matrices to obtain K×rank right singular vectors, where one downlink channel weight matrix includes rank right singular vectors, and one right singular vector includes $N_T$ elements.

In an optional implementation, the second processing unit 1002 includes:
 a sixth processing unit, configured to: obtain K×rank first phase matrices based on the K downlink channel weight matrices and the first polarization direction, and obtain K×rank second phase matrices based on the K downlink channel weight matrices and the second polarization direction, where the first phase matrices and the second phase matrices are all M×N-dimensional matrices; and
 a seventh processing unit, configured to: obtain the K×rank first initial phase difference matrices based on the K×rank first phase matrices, and obtain the K×rank second initial phase difference matrices based on the K×rank second phase matrices.

In an optional implementation, the transmit channels of the base station 100 include transmit channels of M rows and N columns whose polarization directions are the first polarization direction, and transmit channels of M rows and N columns whose polarization directions are the second polarization direction; any element in the first phase matrix is a phase of a corresponding transmit channel whose polarization direction is the first polarization direction, and any element in the second phase matrix is a phase of a corresponding transmit channel whose polarization direction is the second polarization direction; any element in the first initial phase difference matrix is a phase compensation value of a corresponding transmit channel whose polarization direction is the first polarization direction, and any element in the second initial phase difference matrix is a phase compensation value of a corresponding transmit channel whose polarization direction is the second polarization direction.

In an optional implementation, the first phase matrix $\varphi^+$ and the second phase matrix $\varphi^-$ are specifically as follows:

$$\varphi^+ = \begin{bmatrix} \varphi_{M,1} & \varphi_{M,2} & \cdots & \cdots & \cdots & \varphi_{M,N} \\ \vdots & \vdots & \ddots & \vdots & \ddots & \vdots \\ \varphi_{m,1} & \varphi_{m,2} & \cdots & \varphi_{m,n} & \cdots & \varphi_{m,N} \\ \vdots & \vdots & \ddots & \vdots & \ddots & \vdots \\ \varphi_{1,1} & \varphi_{1,2} & \cdots & \cdots & \cdots & \varphi_{1,N} \end{bmatrix}; \text{ and}$$

$$\varphi^- = \begin{bmatrix} \varphi'_{M,1} & \varphi'_{M,2} & \cdots & \cdots & \cdots & \varphi'_{M,N} \\ \vdots & \vdots & \ddots & \vdots & \ddots & \vdots \\ \varphi'_{m,1} & \varphi'_{m,2} & \cdots & \varphi'_{m,n} & \cdots & \varphi'_{m,N} \\ \vdots & \vdots & \ddots & \vdots & \ddots & \vdots \\ \varphi'_{1,1} & \varphi'_{1,2} & \cdots & \cdots & \cdots & \varphi'_{1,N} \end{bmatrix}.$$

A value range of m is [1, M], a value range of n is [1, N], and both m and n are positive integers; and $\varphi_{m,n}$ is a phase of a transmit channel in an $m^{th}$ row and an $n^{th}$ column in transmit channels of M rows and N columns whose polarization directions are the first polarization direction, and $\varphi_{m,n}'$ is a phase of a transmit channel in an $m^{th}$ row and an $n^{th}$ column in transmit channels of M rows and N columns whose polarization directions are the second polarization direction.

The first initial phase difference matrix $\theta^+$ and the second initial phase difference matrix $\theta^-$ are specifically as follows:

$$\theta^+ = (-1) \times \begin{bmatrix} \theta_{M,1} & \theta_{M,2} & \cdots & \cdots & \cdots & \theta_{M,N} \\ \vdots & \vdots & \ddots & \vdots & \ddots & \vdots \\ \theta_{m,1} & \theta_{m,2} & \cdots & \theta_{m,n} & \cdots & \theta_{m,N} \\ \vdots & \vdots & \ddots & \vdots & \ddots & \vdots \\ \theta_{1,1} & \theta_{1,2} & \cdots & \cdots & \cdots & \theta_{1,N} \end{bmatrix}; \text{ and}$$

$$\theta^- = (-1) \times \begin{bmatrix} \theta'_{M,1} & \theta'_{M,2} & \cdots & \cdots & \cdots & \theta'_{M,N} \\ \vdots & \vdots & \ddots & \vdots & \ddots & \vdots \\ \theta'_{m,1} & \theta'_{m,2} & \cdots & \theta'_{m,n} & \cdots & \theta'_{m,N} \\ \vdots & \vdots & \ddots & \vdots & \ddots & \vdots \\ \theta'_{1,1} & \theta'_{1,2} & \cdots & \cdots & \cdots & \theta'_{1,N} \end{bmatrix}.$$

$\theta_{m,n}$ is a first phase compensation value of the transmit channel in the $m^{th}$ row and the $n^{th}$ column of the transmit channels of M rows and N columns whose polarization directions are the first polarization direction, and $\theta_{m,n}=(n-1)\times\Delta_H+(m-1)\times\Delta_V+\varphi_{1,1}-\varphi_{m,n}$; $\theta_{m,n}'$ is a second phase compensation value of the transmit channel in the $m^{th}$ row and the $n^{th}$ column of the transmit channels of M rows and N columns whose polarization directions are the second polarization direction, and $\theta_{m,n}'=(n-1)\times\Delta_H+(m-1)\times\Delta_V+\varphi_{1,1}'-\varphi_{m,n}'$; and $\Delta_H=\varphi_{1,2}-\varphi_{1,1}$, and $\Delta_V=\varphi_{2,1}-\varphi_{1,1}$.

In an optional implementation, the cell initial phase difference matrix includes $N_T$ elements; an element that is in the cell initial phase difference matrix and that corresponds to the transmit channel in the $m^{th}$ row and the $n^{th}$ column in the transmit channels of M rows and N columns whose polarization directions are the first polarization direction is obtained by the base station 100 by performing filtering on the first phase compensation value $\theta_{m,n}$ in the K×rank first initial phase difference matrices for first preset duration; and an element that is in the cell initial phase difference matrix and that corresponds to the transmit channel in the $m^{th}$ row and the $n^{th}$ column in the transmit channels of M rows and N columns whose polarization directions are the second polarization direction is obtained by the base station 100 by performing filtering on the second phase compensation value $\theta_{m,n}'$ in the K×rank second initial phase difference matrices for second preset duration, where a filtering method is a direct average filtering method or an alpha mean filtering method.

Specifically, the first preset duration and the second preset duration may be equal or not equal.

In an optional implementation, the cell initial phase difference matrix includes $N_T$ elements, and any element in the cell initial phase difference matrix corresponds to one transmit channel in the transmit channels of the base station 100 and is for initial phase correction of the transmit channel.

It should be noted that for implementation of each unit, correspondingly refer to the corresponding descriptions in the method embodiment shown in FIG. 2.

Figure 11:
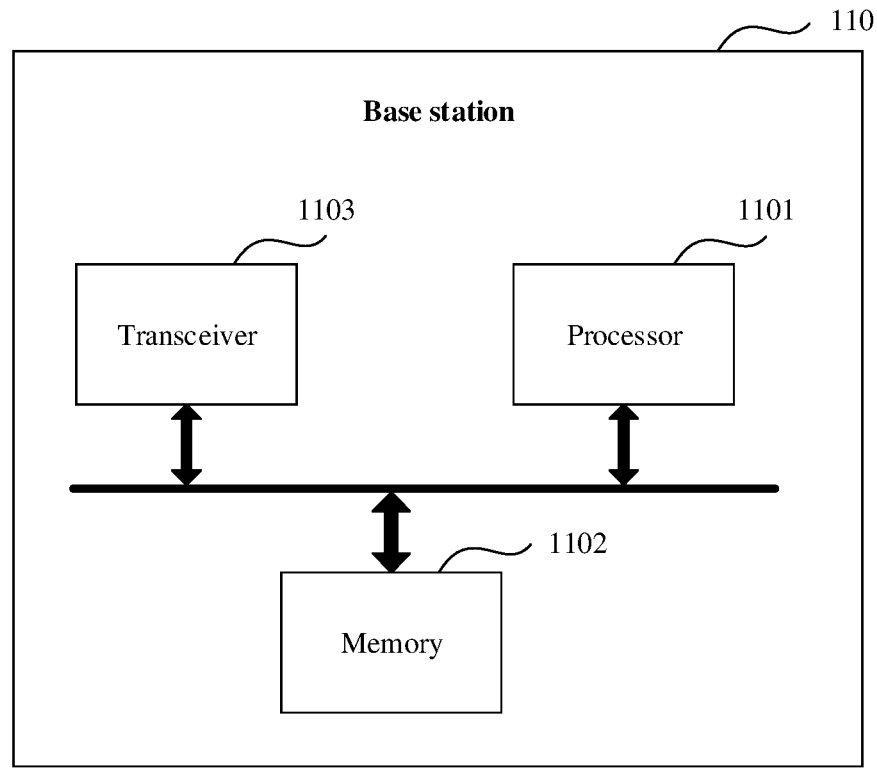
FIG. 11 is a schematic diagram of a structure of another base station according to an embodiment of this application.

FIG. 11 shows a base station 110 according to an embodiment of this application. The base station 110 includes a processor 1101, a memory 1102, and a transceiver 1103. The processor 1101, the memory 1102, and the transceiver 1103 connected to each other by using a bus. The memory 1102 includes, but is not limited to, a random access memory (random access memory, RAM), a read-only memory (ROM), an erasable programmable read-only memory (EPROM), or a compact disc read-only memory (CD-ROM). The memory 1102 is configured to store related computer programs and data. The transceiver 1103 is configured to receive and send the data.

The processor 1101 may be one or more central processing units (CPUs). When the processor 1101 is one CPU, the CPU may be a single-core CPU or a multi-core CPU.

The processor 1101 in the base station 110 is configured to read computer program code stored in the memory 1102, to perform the following operations:

obtaining K downlink channel weight matrices based on K pieces of downlink channel information sent by K UEs, where K is a positive integer, the downlink channel information is fed back by the UE in response to a preset reference signal sent by the base station 110, the downlink channel weight matrix is an $N_T\times$rank-dimensional matrix, $N_T$ is a quantity of transmit channels of the base station 110, and rank is a quantity of signal streams received by the UE;

obtaining K×rank first initial phase difference matrices based on the K downlink channel weight matrices and a first polarization direction of the transmit channels of the base station 110, and obtaining K×rank second initial phase difference matrices based on the K downlink channel weight matrices and a second polarization direction of the transmit channels of the base station 110, where the first polarization direction and the second polarization direction are different, the first initial phase difference matrix and the second initial phase difference matrix are both M×N-dimensional matrices, $N_T=2\times M\times N$, and both M and N are positive integers;

obtaining a cell initial phase difference matrix based on the K×rank first initial phase difference matrices and the K×rank second initial phase difference matrices; and implementing initial phase correction of the transmit channels of the base station 110 based on the cell initial phase difference matrix.

Optionally, the preset reference signal is a channel state information reference signal CSI-RS.

In an optional implementation, the downlink channel information includes at least one precoding matrix indicator PMI fed back by the UE and/or a sounding reference signal SRS fed back by the UE.

In an optional implementation, the downlink channel information is an SRS fed back by the UE. When the processor 1101 obtains K downlink channel weight matrices based on K pieces of downlink channel information sent by K UEs, the processor 1101 specific executes:

obtaining K downlink channel matrices based on the K pieces of downlink channel information, where the downlink channel matrix is an $N_R \times N_T$-dimensional matrix, and $N_R$ is a quantity of receive channels of the UE; and performing singular value decomposition on the K downlink channel matrices to obtain K×rank right singular vectors, where one downlink channel weight matrix includes rank right singular vectors, and one right singular vector includes $N_T$ elements.

In an optional implementation, when the processor 1101 obtains K×rank first initial phase difference matrices based on the K downlink channel weight matrices and a first polarization direction of the transmit channels of the base station 110, and obtains K×rank second initial phase difference matrices based on the K downlink channel weight matrices and a second polarization direction of the transmit channels of the base station 110, the processor 1101 specifically executes:

obtaining K×rank first phase matrices based on the K downlink channel weight matrices and the first polarization direction, and obtaining K×rank second phase matrices based on the K downlink channel weight matrices and the second polarization direction, where the first phase matrices and the second phase matrices are all M×N-dimensional matrices; and obtaining the K×rank first initial phase difference matrices based on the K×rank first phase matrices, and obtaining the K×rank second initial phase difference matrices based on the K×rank second phase matrices.

In an optional implementation, the transmit channels of the base station 110 include transmit channels of M rows and N columns whose polarization directions are the first polarization direction, and transmit channels of M rows and N columns whose polarization directions are the second polarization direction. Any element in the first phase matrix is a phase of a corresponding transmit channel whose polarization direction is the first polarization direction, and any element in the second phase matrix is a phase of a corresponding transmit channel whose polarization direction is the second polarization direction. Any element in the first initial phase difference matrix is a phase compensation value of a corresponding transmit channel whose polarization direction is the first polarization direction, and any element in the second initial phase difference matrix is a phase compensation value of a corresponding transmit channel whose polarization direction is the second polarization direction.

In an optional implementation, the first phase matrix $\varphi^+$ and the second phase matrix $\varphi^-$ are specifically as follows:

$$\varphi^+ = \begin{bmatrix} \varphi_{M,1} & \varphi_{M,2} & \cdots & & \cdots & \varphi_{M,N} \\ \vdots & \vdots & \ddots & \vdots & \ddots & \vdots \\ \varphi_{m,1} & \varphi_{m,2} & \cdots & \varphi_{m,n} & \cdots & \varphi_{m,N} \\ \vdots & \vdots & \ddots & \vdots & \ddots & \vdots \\ \varphi_{1,1} & \varphi_{1,2} & \cdots & & \cdots & \varphi_{1,N} \end{bmatrix}; \text{ and}$$

$$\varphi^- = \begin{bmatrix} \varphi'_{M,1} & \varphi'_{M,2} & \cdots & & \cdots & \varphi'_{M,N} \\ \vdots & \vdots & \ddots & \vdots & \ddots & \vdots \\ \varphi'_{m,1} & \varphi'_{m,2} & \cdots & \varphi'_{m,n} & \cdots & \varphi'_{m,N} \\ \vdots & \vdots & \ddots & \vdots & \ddots & \vdots \\ \varphi'_{1,1} & \varphi'_{1,2} & \cdots & & \cdots & \varphi'_{1,N} \end{bmatrix}.$$

A value range of m is [1, M], a value range of n is [1, N], and both m and n are positive integers. $\varphi_{m,n}$ is a phase of the transmit channel in the $m^{th}$ row and the $n^{th}$ column of the transmit channels of M rows and N columns whose polarization directions are the first polarization direction; $\varphi_{m,n}'$ is a phase of the transmit channel in the $m^{th}$ row and the $n^{th}$ column of the transmit channels of M rows and N columns whose polarization directions are the second polarization direction.

The first initial phase difference matrix $\theta^+$ and the second initial phase difference matrix $\theta^-$ are specifically as follows:

$$\theta^+ = (-1) \times \begin{bmatrix} \theta_{M,1} & \theta_{M,2} & \cdots & & \cdots & \theta_{M,N} \\ \vdots & \vdots & \ddots & \vdots & \ddots & \vdots \\ \theta_{m,1} & \theta_{m,2} & \cdots & \theta_{m,n} & \cdots & \theta_{m,N} \\ \vdots & \vdots & \ddots & \vdots & \ddots & \vdots \\ \theta_{1,1} & \theta_{1,2} & \cdots & & \cdots & \theta_{1,N} \end{bmatrix}; \text{ and}$$

$$\theta^- = (-1) \times \begin{bmatrix} \theta'_{M,1} & \theta'_{M,2} & \cdots & & \cdots & \theta'_{M,N} \\ \vdots & \vdots & \ddots & \vdots & \ddots & \vdots \\ \theta'_{m,1} & \theta'_{m,2} & \cdots & \theta'_{m,n} & \cdots & \theta'_{m,N} \\ \vdots & \vdots & \ddots & \vdots & \ddots & \vdots \\ \theta'_{1,1} & \theta'_{1,2} & \cdots & & \cdots & \theta'_{1,N} \end{bmatrix}.$$

$\theta_{m,n}$ is a first phase compensation value of the transmit channel in the $m^{th}$ row and the $n^{th}$ column of the transmit channels of M rows and N columns whose polarization directions are the first polarization direction, and $\theta_{m,n}=(n-1) \times \Delta_H+(m-1) \times \Delta_V+\varphi_{1,1}-\varphi_{m,n}$. $\theta_{m,n}'$ is a second phase compensation value of the transmit channel in the $m^{th}$ row and the $n^{th}$ column of the transmit channels of M rows and N columns whose polarization directions are the second polarization direction, and $\theta_{m,n}'=(n-1) \times \Delta_H+(m-1) \times \Delta_V+\varphi_{1,1}'-\varphi_{m,n}'$. $\Delta_H=\varphi_{1,2}-\varphi_{1,1}$, and $\Delta_V=\varphi_{2,1}-\varphi_{1,1}$.

In an optional implementation, the cell initial phase difference matrix includes $N_T$ elements. An element that corresponds to a transmit channel in an $m^{th}$ row and an $n^{th}$ column in the transmit channels of M rows and N columns whose polarization directions are the first polarization direction and that is in the cell initial phase difference matrix is obtained by the base station 110 by performing filtering on the first phase compensation value $\theta_{m,n}$ in the K×rank first initial phase difference matrices for first preset duration. An element that corresponds to a transmit channel in an $m^{th}$ row and an $n^{th}$ column in the transmit channels of M rows and N columns whose first polarization directions are the second polarization direction and that is in the cell initial phase difference matrix is obtained by the base station 110 by performing filtering on the second phase compensation value $\theta_{m,n}'$ in the K×rank second initial phase difference matrices for second preset duration. The filtering processing method is a direct average filtering method or an alpha mean filtering method.

Specifically, the first preset duration and the second preset duration may be equal or not equal.

In an optional implementation, the cell initial phase difference matrix includes $N_T$ elements, and any element in the cell initial phase difference matrix corresponds to one transmit channel in the transmit channels of the base station 110 and is for initial phase correction of the transmit channel.

It should be noted that, for implementation of each operation, refer to corresponding descriptions in the method embodiment shown in FIG. 2.

An embodiment of this application further provides a chip. The chip includes at least one processor and an interface circuit. Optionally, the chip further includes a memory. The memory, the interface circuit, and the at least one processor are connected to each other by using a line, and the at least one memory stores a computer program. When the computer program is executed by the processor, an operation performed in the embodiment shown in FIG. 2 is implemented. An embodiment of this application further provides a computer storage medium. The computer storage medium stores a computer program. The computer program includes program instructions. When executed by a processor, the program instructions are configured to perform an operation performed in the embodiment shown in FIG. 2. An embodiment of this application further provides a computer program product. When the computer program product runs on a base station, the base station is enabled to perform an operation performed in the embodiment shown in FIG. 2.

A person of ordinary skill in the art may understand that all or some of the processes of the methods in the foregoing embodiments may be implemented by a computer program instructing related hardware. The computer program may be stored in a computer-readable storage medium. When the computer program is run, the processes in the foregoing method embodiments are performed. The foregoing storage medium includes: any medium that can store computer program code, such as a ROM, a random access memory RAM, a magnetic disk, or an optical disc.

What is claimed is:

1. A method, comprising:
obtaining, by a base station, K downlink channel weight matrices based on K pieces of downlink channel information sent by K user equipment (UEs), wherein K is a positive integer, the K pieces of downlink channel information are fed back by the K UEs in response to a preset reference signal sent by the base station, each downlink channel weight matrix is an $N_T \times rank$-dimensional matrix, $N_T$ is a quantity of transmit channels of the base station, and rank is a quantity of signal streams received by a UE corresponding to the respective downlink channel weight matrix;
obtaining K×rank first initial phase difference matrices based on the K downlink channel weight matrices and a first polarization direction of the transmit channels of the base station, and obtaining K×rank second initial phase difference matrices based on the K downlink channel weight matrices and a second polarization direction of the transmit channels of the base station, wherein the first polarization direction is different from the second polarization direction, the K×rank first initial phase difference matrices and the K×rank second initial phase difference matrices are all M×N-dimensional matrices, $N_T = 2 \times M \times N$, and both M and N are positive integers;
obtaining a cell initial phase difference matrix based on the K×rank first initial phase difference matrices and the K×rank second initial phase difference matrices; and
implementing initial phase correction of the transmit channels of the base station based on the cell initial phase difference matrix.

2. The method according to claim 1, wherein each piece of downlink channel information comprises at least one precoding matrix indicator (PMI) fed back by a UE that sends the respective piece of downlink channel information or a sounding reference signal (SRS) fed back by the UE that sends the respective piece of downlink channel information.

3. The method according to claim 1, wherein the K pieces of downlink channel information are sounding reference signals (SRSs) fed back by the K UEs, and obtaining, by the base station, the K downlink channel weight matrices based on the K pieces of downlink channel information sent by the K UEs comprises:
obtaining K downlink channel matrices based on the K pieces of downlink channel information, wherein each downlink channel matrix is an $N_R \times N_T$-dimensional matrix, and $N_R$ is a quantity of receive channels of the UE that sends a piece of downlink channel information corresponding to the respective downlink channel matrix; and
performing singular value decomposition on the K downlink channel matrices to obtain K×rank right singular vectors, wherein at least one downlink channel weight matrix comprises rank right singular vectors, and at least one right singular vector comprises $N_T$ elements.

4. The method according to claim 1, wherein obtaining the K×rank first initial phase difference matrices based on the K downlink channel weight matrices and the first polarization direction of the transmit channels of the base station, and obtaining the K×rank second initial phase difference matrices based on the K downlink channel weight matrices and the second polarization direction of the transmit channels of the base station comprises:
obtaining K×rank first phase matrices based on the K downlink channel weight matrices and the first polarization direction, and obtaining K×rank second phase matrices based on the K downlink channel weight matrices and the second polarization direction, wherein the K×rank first phase matrices and the K×rank second phase matrices are all M×N-dimensional matrices; and
obtaining the K×rank first initial phase difference matrices based on the K×rank first phase matrices, and obtaining the K×rank second initial phase difference matrices based on the K×rank second phase matrices.

5. The method according to claim 1, wherein the transmit channels of the base station comprise transmit channels of M rows and N columns whose polarization directions are the first polarization direction, and transmit channels of M rows and N columns whose polarization directions are the second polarization direction;
wherein any element in a first phase matrix corresponding to at least one downlink channel weight matrix is a phase of a corresponding transmit channel whose polarization direction is the first polarization direction, and any element in a second phase matrix corresponding to at least one downlink channel weight matrix is a phase of a corresponding transmit channel whose polarization direction is the second polarization direction; and
wherein any element in each first initial phase difference matrix is a phase compensation value of a corresponding transmit channel whose polarization direction is the first polarization direction, and any element in each second initial phase difference matrix is a phase compensation value of a corresponding transmit channel whose polarization direction is the second polarization direction.

6. The method according to claim 5, wherein each first phase matrix $\varphi^+$ and each second phase matrix $\varphi^-$ are as follows:

$$\varphi^+ = \begin{bmatrix} \varphi_{M,1} & \varphi_{M,2} & \cdots & \cdots & \cdots & \varphi_{M,N} \\ \vdots & \vdots & \ddots & \vdots & \ddots & \vdots \\ \varphi_{m,1} & \varphi_{m,2} & \cdots & \varphi_{m,n} & \cdots & \varphi_{m,N} \\ \vdots & \vdots & \ddots & \vdots & \ddots & \vdots \\ \varphi_{1,1} & \varphi_{1,2} & \cdots & \cdots & \cdots & \varphi_{1,N} \end{bmatrix} ; \text{ and}$$

-continued $$\varphi^- = \begin{bmatrix} \varphi'_{M,1} & \varphi'_{M,2} & \cdots & \cdots & \cdots & \varphi'_{M,N} \\ \vdots & \vdots & \ddots & \vdots & \ddots & \vdots \\ \varphi'_{m,1} & \varphi'_{m,2} & \cdots & \varphi'_{m,n} & \cdots & \varphi'_{m,N} \\ \vdots & \vdots & \ddots & \vdots & \ddots & \vdots \\ \varphi'_{1,1} & \varphi'_{1,2} & \cdots & \cdots & \cdots & \varphi'_{1,N} \end{bmatrix},$$

wherein a value range of m is [1, M], a value range of n is [1, N], and both m and n are positive integers; and $\varphi_{m,n}$ is a phase of a transmit channel in an $m^{th}$ row and an $n^{th}$ column in transmit channels of M rows and N columns whose polarization directions are the first polarization direction, and $\varphi'_{m,n}$ is a phase of a transmit channel in an $m^{th}$ row and an $n^{th}$ column in transmit channels of M rows and N columns whose polarization directions are the second polarization direction; and each first initial phase difference matrix $\theta^+$ and each second initial phase difference matrix $\theta^-$ are as follows:

$$\theta^+ = (-1) \times \begin{bmatrix} \theta_{M,1} & \theta_{M,2} & \cdots & \cdots & \cdots & \theta_{M,N} \\ \vdots & \vdots & \ddots & \vdots & \ddots & \vdots \\ \theta_{m,1} & \theta_{m,2} & \cdots & \theta_{m,n} & \cdots & \theta_{m,N} \\ \vdots & \vdots & \ddots & \vdots & \ddots & \vdots \\ \theta_{1,1} & \theta_{1,2} & \cdots & \cdots & \cdots & \theta_{1,N} \end{bmatrix}; \text{ and}$$

$$\theta^- = (-1) \times \begin{bmatrix} \theta'_{M,1} & \theta'_{m,2} & \cdots & \cdots & \cdots & \theta'_{M,N} \\ \vdots & \vdots & \ddots & \vdots & \ddots & \vdots \\ \theta'_{m,1} & \theta'_{m,2} & \cdots & \theta'_{m,n} & \cdots & \theta'_{m,N} \\ \vdots & \vdots & \ddots & \vdots & \ddots & \vdots \\ \theta'_{1,1} & \theta'_{1,2} & \cdots & \cdots & \cdots & \theta'_{1,N} \end{bmatrix},$$

wherein $\theta_{m,n}$ is a first phase compensation value of the transmit channel in the $m^{th}$ row and the $n^{th}$ column of the transmit channels of M rows and N columns whose polarization directions are the first polarization direction, and $\theta_{m,n}=(n-x)\times\Delta_H+(m-y)\times\Delta_V+\varphi_{x,y}-\varphi_{m,n}$; $\theta'_{m,n}$ is a second phase compensation value of the transmit channel in the $m^{th}$ row and the $n^{th}$ column of the transmit channels of M rows and N columns whose polarization directions are the second polarization direction, and $\theta'_{m,n}=(n-x)\times\Delta_H+(m-y)\times\Delta_V+\varphi'_{x,y}-\varphi'_{m,n}$; and $\Delta_H=\varphi_{x,y+1}-\varphi_{x,y}$, $\Delta_V=\varphi_{x+1,y}-\varphi_{x,y}$, a value range of x is [1, M], and a value range of y is [1, N].

7. The method according to claim 6, wherein the cell initial phase difference matrix comprises $N_T$ elements;

wherein an element that is in the cell initial phase difference matrix and that corresponds to the transmit channel in the $m^{th}$ row and the $n^{th}$ column in the transmit channels of M rows and N columns whose polarization directions are the first polarization direction is obtained by the base station by performing filtering on the first phase compensation value $\theta_{m,n}$ in the K×rank first initial phase difference matrices for first preset duration; and wherein an element that is in the cell initial phase difference matrix and that corresponds to the transmit channel in the $m^{th}$ row and the $n^{th}$ column in the transmit channels of M rows and N columns whose polarization directions are the second polarization direction is obtained by the base station by performing filtering on the second phase compensation value $\theta'_{m,n}$ in the K×rank second initial phase difference matrices for second preset duration, wherein a filtering method is a direct average filtering method or an alpha mean filtering method.

8. An apparatus, applied to a base station, the apparatus comprising:

at least one processor; and a non-transitory memory storing instructions that are executable by the at least one processor;

wherein, when executed, the instructions cause the apparatus to perform operations comprising:

obtaining K downlink channel weight matrices based on K pieces of downlink channel information sent by K user equipment (UEs), wherein K is a positive integer, the K pieces of downlink channel information are fed back by the K UEs in response to a preset reference signal sent by the base station, each downlink channel weight matrix is an $N_T \times$rank-dimensional matrix, $N_T$ is a quantity of transmit channels of the base station, and rank is a quantity of signal streams received by a UE corresponding to the respective downlink channel weight matrix;

obtaining K×rank first initial phase difference matrices based on the K downlink channel weight matrices and a first polarization direction of the transmit channels of the base station, and obtaining K×rank second initial phase difference matrices based on the K downlink channel weight matrices and a second polarization direction of the transmit channels of the base station, wherein the first polarization direction is different from the second polarization direction, the K×rank first initial phase difference matrices and the K×rank second initial phase difference matrices are all M×N-dimensional matrices, $N_T=2\times M\times N$, and both M and N are positive integers;

obtaining a cell initial phase difference matrix based on the K×rank first initial phase difference matrices and the K×rank second initial phase difference matrices; and implementing initial phase correction of the transmit channels of the base station based on the cell initial phase difference matrix.

9. The apparatus according to claim 8, wherein each piece of downlink channel information comprises at least one precoding matrix indicator (PMI) fed back by the UE that sends the respective piece of downlink channel information or a sounding reference signal (SRS) fed back by the UE that sends the respective piece of downlink channel information.

10. The apparatus according to claim 8, wherein the K pieces of downlink channel information are sounding reference signals (SRS) fed back by the K UEs, and obtaining, by the base station, the K downlink channel weight matrices based on the K pieces of downlink channel information sent by the K UEs comprises:

obtaining K downlink channel matrices based on the K pieces of downlink channel information, wherein each downlink channel matrix is an $N_R \times N_T$-dimensional matrix, and $N_R$ is a quantity of receive channels of a UE that sends a piece of downlink channel information corresponding to the respective downlink channel matrix; and performing singular value decomposition on the K downlink channel matrices to obtain K×rank right singular vectors, wherein at least one downlink channel weight matrix comprises rank right singular vectors, and at least one right singular vector comprises $N_T$ elements.

11. The apparatus according to claim 8, wherein obtaining the K×rank first initial phase difference matrices based on the K downlink channel weight matrices and the first polarization direction of the transmit channels of the base station, and obtaining the K×rank second initial phase difference matrices based on the K downlink channel weight matrices and the second polarization direction of the transmit channels of the base station comprises:
  obtaining K×rank first phase matrices based on the K downlink channel weight matrices and the first polarization direction, and obtaining K×rank second phase matrices based on the K downlink channel weight matrices and the second polarization direction, wherein the first phase matrices and the second phase matrices are all M×N-dimensional matrices; and
  obtaining the K×rank first initial phase difference matrices based on the K×rank first phase matrices, and obtaining the K×rank second initial phase difference matrices based on the K×rank second phase matrices.

12. The apparatus according to claim 8, wherein the transmit channels of the base station comprise transmit channels of M rows and N columns whose polarization directions are the first polarization direction, and transmit channels of M rows and N columns whose polarization directions are the second polarization direction;
  wherein any element in a first phase matrix corresponding to at least one downlink channel weight matrix is a phase of a corresponding transmit channel whose polarization direction is the first polarization direction, and any element in a second phase matrix corresponding to at least one downlink channel weight matrix is a phase of a corresponding transmit channel whose polarization direction is the second polarization direction; and
  wherein any element in each first initial phase difference matrix is a phase compensation value of a corresponding transmit channel whose polarization direction is the first polarization direction, and any element in each second initial phase difference matrix is a phase compensation value of a corresponding transmit channel whose polarization direction is the second polarization direction.

13. The apparatus according to claim 12, wherein the first phase matrix $\varphi^+$ and the second phase matrix $\varphi^-$ are as follows:

$$\varphi^+ = \begin{bmatrix} \varphi_{M,1} & \varphi_{M,2} & \cdots & \cdots & \cdots & \varphi_{M,N} \\ \vdots & \vdots & \ddots & \vdots & \ddots & \vdots \\ \varphi_{m,1} & \varphi_{m,2} & \cdots & \varphi_{m,n} & \cdots & \varphi_{m,N} \\ \vdots & \vdots & \ddots & \vdots & \ddots & \vdots \\ \varphi_{1,1} & \varphi_{1,2} & \cdots & \cdots & \cdots & \varphi_{1,N} \end{bmatrix}; \text{ and}$$

$$\varphi^- = \begin{bmatrix} \varphi'_{M,1} & \varphi'_{M,2} & \cdots & \cdots & \cdots & \varphi'_{M,N} \\ \vdots & \vdots & \ddots & \vdots & \ddots & \vdots \\ \varphi'_{m,1} & \varphi'_{m,2} & \cdots & \varphi'_{m,n} & \cdots & \varphi'_{m,N} \\ \vdots & \vdots & \ddots & \vdots & \ddots & \vdots \\ \varphi'_{1,1} & \varphi'_{1,2} & \cdots & \cdots & \cdots & \varphi'_{1,N} \end{bmatrix},$$

wherein
a value range of m is [1, M], a value range of n is [1, N], and both m and n are positive integers; and $\varphi_{m,n}$ is a phase of a transmit channel in an $m^{th}$ row and an $n^{th}$ column in transmit channels of M rows and N columns whose polarization directions are the first polarization direction, and $\varphi'_{m,n}$ is a phase of a transmit channel in an $m^{th}$ row and an $n^{th}$ column in transmit channels of M rows and N columns whose polarization directions are the second polarization direction; and wherein each first initial phase difference matrix $\theta^+$ and each second initial phase difference matrix $\theta^-$ are as follows:

$$\theta^+ = (-1) \times \begin{bmatrix} \theta_{M,1} & \theta_{M,2} & \cdots & \cdots & \cdots & \theta_{M,N} \\ \vdots & \vdots & \ddots & \vdots & \ddots & \vdots \\ \theta_{m,1} & \theta_{m,2} & \cdots & \theta_{m,n} & \cdots & \theta_{m,N} \\ \vdots & \vdots & \ddots & \vdots & \ddots & \vdots \\ \theta_{1,1} & \theta_{1,2} & \cdots & \cdots & \cdots & \theta_{1,N} \end{bmatrix}; \text{ and}$$

$$\theta^- = (-1) \times \begin{bmatrix} \theta'_{M,1} & \theta'_{M,2} & \cdots & \cdots & \cdots & \theta'_{M,N} \\ \vdots & \vdots & \ddots & \vdots & \ddots & \vdots \\ \theta'_{m,1} & \theta'_{m,2} & \cdots & \theta'_{m,n} & \cdots & \theta'_{m,N} \\ \vdots & \vdots & \ddots & \vdots & \ddots & \vdots \\ \theta'_{1,1} & \theta'_{1,2} & \cdots & \cdots & \cdots & \theta'_{1,N} \end{bmatrix},$$

wherein
$\theta_{m,n}$ is a first phase compensation value of the transmit channel in the $m^{th}$ row and the $n^{th}$ column of the transmit channels of M rows and N columns whose polarization directions are the first polarization direction, and $\theta_{m,n} = (n-x) \times \Delta_H + (m-y) \times \Delta_V + \varphi_{x,y} - \varphi_{m,n}$; $\theta'_{m,n}$ is a second phase compensation value of the transmit channel in the $m^{th}$ row and the $n^{th}$ column of the transmit channels of M rows and N columns whose polarization directions are the second polarization direction, and $\theta'_{m,n} = (n-x) \times \Delta_H + (m-y) \times \Delta_V + \varphi'_{x,y} - \varphi'_{m,n}$; and $\Delta_H = \varphi_{x,y+1} - \varphi_{x,y}$, $\Delta_V = \varphi_{x+1,y} - \varphi_{x,y}$, a value range of x is [1, M], and a value range of y is [1, N].

14. The apparatus according to claim 13, wherein the cell initial phase difference matrix comprises $N_T$ elements;
  wherein an element that is in the cell initial phase difference matrix and that corresponds to the transmit channel in the $m^{th}$ row and the $n^{th}$ column in the transmit channels of M rows and N columns whose polarization directions are the first polarization direction is obtained by the base station by performing filtering on the first phase compensation value $\theta_{m,n}$ in the K×rank first initial phase difference matrices for a first preset duration; and
  wherein an element that is in the cell initial phase difference matrix and that corresponds to the transmit channel in the $m^{th}$ row and the $n^{th}$ column in the transmit channels of M rows and N columns whose polarization directions are the second polarization direction is obtained by the base station by performing filtering on the second phase compensation value $\theta'_{m,n}$ in the K×rank second initial phase difference matrices for a second preset duration, and wherein a filtering method is a direct average filtering method or an alpha mean filtering method.

15. A non-transitory memory storage medium comprising computer-executable instructions that, when executed, facilitate a base station carrying out operations comprising:
  obtaining K downlink channel weight matrices based on K pieces of downlink channel information sent by K user equipment (UEs), wherein K is a positive integer, the K pieces of downlink channel information are fed back by the K UEs in response to a preset reference signal sent by the base station, each downlink channel weight matrix is an $N_T \times \text{rank}$-dimensional matrix, $N_T$ is a quantity of transmit channels of the base station, and rank is a quantity of signal streams received by a UE corresponding to the respective downlink channel weight matrix;

obtaining K×rank first initial phase difference matrices based on the K downlink channel weight matrices and a first polarization direction of the transmit channels of the base station, and obtaining K×rank second initial phase difference matrices based on the K downlink channel weight matrices and a second polarization direction of the transmit channels of the base station, wherein the first polarization direction is different from the second polarization direction, the K×rank first initial phase difference matrices and the K×rank second initial phase difference matrices are all M×N-dimensional matrices, $N_T = 2 \times M \times N$, and both M and N are positive integers;

obtaining a cell initial phase difference matrix based on the K×rank first initial phase difference matrices and the K×rank second initial phase difference matrices; and implementing initial phase correction of the transmit channels of the base station based on the cell initial phase difference matrix.

16. The non-transitory memory storage medium according to claim 15, wherein the K pieces of downlink channel information comprise at least one precoding matrix indicator (PMI) fed back by a UE that sends the respective piece of downlink channel information or a sounding reference signal (SRS) fed back by the UE that sends the respective piece of downlink channel information.

17. The non-transitory memory storage medium according to claim 15, wherein the K pieces of downlink channel information are sounding reference signals (SRSs) fed back by the K UEs, and obtaining the K downlink channel weight matrices based on the K pieces of downlink channel information sent by the K UEs comprises:

obtaining K downlink channel matrices based on the K pieces of downlink channel information, wherein each downlink channel matrix is an $N_R \times N_T$-dimensional matrix, and $N_R$ is a quantity of receive channels of a UE that corresponds to the respective downlink channel matrix; and performing singular value decomposition on the K downlink channel matrices to obtain K×rank right singular vectors, wherein at least one downlink channel weight matrix comprises rank right singular vectors, and at least one right singular vector comprises $N_T$ elements.

18. The non-transitory memory storage medium according to claim 15, wherein obtaining the K×rank first initial phase difference matrices based on the K downlink channel weight matrices and the first polarization direction of the transmit channels of the base station, and obtaining the K×rank second initial phase difference matrices based on the K downlink channel weight matrices and the second polarization direction of the transmit channels of the base station comprises:

obtaining K×rank first phase matrices based on the K downlink channel weight matrices and the first polarization direction, and obtaining K×rank second phase matrices based on the K downlink channel weight matrices and the second polarization direction, wherein the K×rank first phase matrices and the K×rank second phase matrices are all M×N-dimensional matrices; and obtaining the K×rank first initial phase difference matrices based on the K×rank first phase matrices, and obtaining the K×rank second initial phase difference matrices based on the K×rank second phase matrices.

19. The non-transitory memory storage medium according to claim 15, wherein the transmit channels of the base station comprise transmit channels of M rows and N columns whose polarization directions are the first polarization direction, and transmit channels of M rows and N columns whose polarization directions are the second polarization direction;

wherein any element in a first phase matrix corresponding to at least one downlink channel weight matrix is a phase of a corresponding transmit channel whose polarization direction is the first polarization direction, and any element in a second phase matrix corresponding to at least one downlink channel weight matrix is a phase of a corresponding transmit channel whose polarization direction is the second polarization direction; and wherein any element in each first initial phase difference matrix is a phase compensation value of a corresponding transmit channel whose polarization direction is the first polarization direction, and any element in each second initial phase difference matrix is a phase compensation value of a corresponding transmit channel whose polarization direction is the second polarization direction.

20. The non-transitory memory storage medium according to claim 19, wherein the first phase matrix $\varphi^+$ and the second phase matrix $\varphi^-$ are as follows:

$$\varphi^+ = \begin{bmatrix} \varphi_{M,1} & \varphi_{M,2} & \cdots & \cdots & \cdots & \varphi_{M,N} \\ \vdots & \vdots & \ddots & \vdots & \ddots & \vdots \\ \varphi_{m,1} & \varphi_{m,2} & \cdots & \varphi_{m,n} & \cdots & \varphi_{m,N} \\ \vdots & \vdots & \ddots & \vdots & \ddots & \vdots \\ \varphi_{1,1} & \varphi_{1,2} & \cdots & \cdots & \cdots & \varphi_{1,N} \end{bmatrix} ; \text{ and}$$

$$\varphi^- = \begin{bmatrix} \varphi'_{M,1} & \varphi'_{M,2} & \cdots & \cdots & \cdots & \varphi'_{M,N} \\ \vdots & \vdots & \ddots & \vdots & \ddots & \vdots \\ \varphi'_{m,1} & \varphi'_{m,2} & \cdots & \varphi'_{m,n} & \cdots & \varphi'_{m,N} \\ \vdots & \vdots & \ddots & \vdots & \ddots & \vdots \\ \varphi'_{1,1} & \varphi'_{1,2} & \cdots & \cdots & \cdots & \varphi'_{1,N} \end{bmatrix} ,$$

wherein a value range of m is [1, M], a value range of n is [1, N], and both m and n are positive integers; and $\varphi_{m,n}$ is a phase of a transmit channel in an $m^{th}$ row and an $n^{th}$ column in transmit channels of M rows and N columns whose polarization directions are the first polarization direction, and $\varphi'_{m,n}$ is a phase of a transmit channel in an $m^{th}$ row and an $n^{th}$ column in transmit channels of M rows and N columns whose polarization directions are the second polarization direction; and wherein each first initial phase difference matrix $\theta^+$ and each second initial phase difference matrix $\theta^-$ are as follows:

$$\theta^+ = (-1) \times \begin{bmatrix} \theta_{M,1} & \theta_{M,2} & \cdots & \cdots & \cdots & \theta_{M,N} \\ \vdots & \vdots & \ddots & \vdots & \ddots & \vdots \\ \theta_{m,1} & \theta_{m,2} & \cdots & \theta_{m,n} & \cdots & \theta_{m,N} \\ \vdots & \vdots & \ddots & \vdots & \ddots & \vdots \\ \theta_{1,1} & \theta_{1,2} & \cdots & \cdots & \cdots & \theta_{1,N} \end{bmatrix} ; \text{ and}$$

$$\theta^- = (-1) \times \begin{bmatrix} \theta'_{M,1} & \theta'_{M,2} & \cdots & \cdots & \cdots & \theta'_{M,N} \\ \vdots & \vdots & \ddots & \vdots & \ddots & \vdots \\ \theta'_{m,1} & \theta'_{m,2} & \cdots & \theta'_{m,n} & \cdots & \theta'_{m,N} \\ \vdots & \vdots & \ddots & \vdots & \ddots & \vdots \\ \theta'_{1,1} & \theta'_{1,2} & \cdots & \cdots & \cdots & \theta'_{1,N} \end{bmatrix} ,$$

wherein $\theta_{m,n}$ is a first phase compensation value of the transmit channel in the $m^{th}$ row and the $n^{th}$ column of the transmit channels of M rows and N columns whose polarization directions are the first polarization direction, and $\theta_{m,n}=(n-x)\times\Delta_H+(m-y)\times\Delta_V+\varphi_{x,y}-\varphi_{m,n}$; $\varphi'_{m,n}$ is a second phase compensation value of the transmit channel in the $m^{th}$ row and the $n^{th}$ column of the transmit channels of M rows and N columns whose polarization directions are the second polarization direction, and $\theta'_{m,n}=(n-x)\times\Delta_H+(m-y)\times\Delta_V+\varphi'_{x,y}-\varphi'_{m,n}$; and $\Delta_H=\varphi_{x,y+1}-\varphi_{x,y}$, $\Delta_V=\varphi_{x+1,y}-\varphi_{x,y}$, a value range of x is [1, M], and a value range of y is [1, N].

\* \* \* \* \*

UNITED STATES PATENT AND TRADEMARK OFFICE
CERTIFICATE OF CORRECTION

PATENT NO. : 12,057,904 B2
APPLICATION NO. : 18/154997
DATED : August 6, 2024
INVENTOR(S) : Jiang et al.

Page 1 of 1

It is certified that error appears in the above-identified patent and that said Letters Patent is hereby corrected as shown below:

In the Claims

In Column 46, in Claim 14, Line 49, delete "$\theta_{m,n}$" and insert -- $\theta'_{m,n}$ --.

In Column 48, in Claim 20, Line 61, delete "$\theta'_{m,2}$" and insert -- $\theta'_{M,2}$ --.

In Column 49, in Claim 20, Line 6, delete "$\varphi'_{m,n}$" and insert -- $\theta'_{m,n}$ --.

In Column 49, in Claim 20, Line 11, delete "$\varphi'_{x,y}\varphi'_{m,n}$;" and insert -- $\varphi'_{x,y}-\varphi'_{m,n}$; --.

Signed and Sealed this
Eighth Day of October, 2024

Katherine Kelly Vidal
*Director of the United States Patent and Trademark Office*